US010766071B2

(12) United States Patent
Kecskes et al.

(10) Patent No.: US 10,766,071 B2
(45) Date of Patent: Sep. 8, 2020

(54) EXTREME CREEP RESISTANT NANO-CRYSTALLINE METALLIC MATERIALS

(71) Applicant: U.S. Army Research Laboratory ATTN: RDRL-LOC-I, Adelphi, MD (US)

(72) Inventors: Laszlo J. Kecskes, Havre De Grace, MD (US); Kristopher A. Darling, Havre De Grace, MD (US); Rajiv S. Mishra, Denton, TX (US); Yuri Mishin, Centreville, VA (US); Kiran N. Solanki, Tempe, AZ (US); Mansa Rajagopalan, San Ramon, CA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 184 days.

(21) Appl. No.: 15/896,804

(22) Filed: Feb. 14, 2018

(65) Prior Publication Data

US 2018/0229308 A1    Aug. 16, 2018

Related U.S. Application Data

(60) Provisional application No. 62/459,243, filed on Feb. 15, 2017.

(51) Int. Cl.
*B22F 9/00* (2006.01)
*B22F 9/12* (2006.01)
(Continued)

(52) U.S. Cl.
CPC ............ *B22F 9/002* (2013.01); *B22F 1/0044* (2013.01); *B22F 9/04* (2013.01); *B22F 9/12* (2013.01);
(Continued)

(58) Field of Classification Search
CPC .................................. B22F 9/002; B22F 9/12
(Continued)

(56) References Cited

U.S. PATENT DOCUMENTS 9,333,558 B2 * 5/2016 Darling ................. B22F 1/0018
9,791,394 B2 10/2017 Murdoch et al.
(Continued)

OTHER PUBLICATIONS

M.A. Meyers, A. Mishra, D.J. Benson, "Mechanical properties of nanocrystalline materials," Progress in Materials Science 51 (2006) 427-556.
(Continued)

*Primary Examiner* — Weiping Zhu
(74) *Attorney, Agent, or Firm* — Eric B. Compton

(57) ABSTRACT

Novel metallic systems and methods for their fabrication provide an extreme creep-resistant nano-crystalline metallic material. The material comprises a matrix formed of a solvent metal with crystalline grains having diameters of no more than about 500 nm, and a plurality of dispersed metallic particles formed on the basis of a solute metal in the solvent metal matrix and having diameters of no more than about 200 nm. The particle density along the grain boundary of the matrix is as high as about 2 nm² of grain boundary area per particle so as to substantially block grain boundary motion and rotation and limit creep at temperatures above 35% of the melting point of the material.

17 Claims, 12 Drawing Sheets

(51) Int. Cl.
*B22F 9/14* (2006.01)
*C22C 9/00* (2006.01)
*B22F 9/04* (2006.01)
*B22F 1/00* (2006.01)
*C22C 1/04* (2006.01)
*B82Y 40/00* (2011.01)
*B22F 3/20* (2006.01)
*B82Y 30/00* (2011.01)

(52) U.S. Cl.
CPC .............. *B22F 9/14* (2013.01); *C22C 1/0425* (2013.01); *C22C 9/00* (2013.01); *B22F 3/20* (2013.01); *B22F 2009/041* (2013.01); *B22F 2009/043* (2013.01); *B22F 2202/03* (2013.01); *B22F 2301/10* (2013.01); *B22F 2301/155* (2013.01); *B22F 2301/205* (2013.01); *B22F 2301/25* (2013.01); *B22F 2301/35* (2013.01); *B22F 2304/054* (2013.01); *B22F 2999/00* (2013.01); *B82Y 30/00* (2013.01); *B82Y 40/00* (2013.01); *C22C 2200/04* (2013.01); *C22C 2202/00* (2013.01)

(58) Field of Classification Search
USPC ......................................................... 75/247
See application file for complete search history.

(56) References Cited

U.S. PATENT DOCUMENTS

| 9,822,430 | B2* | 11/2017 | Kecskes | ..................... B22F 3/02 |
| 10,209,208 | B2 | 2/2019 | Murdoch et al. | |
| 10,487,375 | B2* | 11/2019 | Kecskes | ..................... F42B 3/28 |
| 2016/0319397 | A1 | 11/2016 | Kecskes et al. | |

OTHER PUBLICATIONS

S. Gollapudia, et al., "Creep in nanocrystalline materials: Role of stress assisted grain growth," Materials Science and Engineering A 527 (2010) 5773-5781.

Mark A. Atwater and Kris A. Darling, "A Visual Library of Stability in Binary Metallic Systems: The Stabilization of Nanocrystalline Grain Size by Solute Addition: Part 1," ARL-TR-6007, May 2012.

K.N. Solanki, K.A. Darling, M. Komarasamy, M. Rajagopalan, M.A. Bhatia, B.C. Hornbuckle, R. Mishra, Slide Presentation titled "Creep behavior of a microstructurally stable nanocrystalline alloy," TMS2017, Feb. 26-Mar. 2, 2017.

K. A. Darling, Slide Presentation titled "Nanocrystalline Metals in Army and DoD Applications," ARL, Feb. 27, 2017.

Ashby, M. F., "A first report on deformation-mechanism maps," Acta Metall. 20, 887-897 (1972).

H. Zoz, H. Ren, R. Reichardt, H.U. Benz, "Mechanical Alloying— Principle, Development & Current Activities (Part I-VII)," Thermec2000, International Conference on Processing & Manufacturing of Advanced Materials Dec. 4-8, 2000, Las Vegas, Nevada, U.S.A., (available online at: http://gmbh.zoz.de/_AKTUELL/pdf_content/publications/v14.pdf).

Mohamed, F. A. & Li, Y., "Creep and superplasticity in nanocrystalline materials: current understanding and future prospects," Mater. Sci. Eng. A 298, 1-15 (2001).

Introduction to Mineral Science by Andrew Puntis Cambridge University Press 2003, ISBN 0 521-41922-0, pp. 333, 334, 336 and 337.

Materials Science and Engineering "An Introduction" 9th Ed. by William D Callister Jr., and David G Rethwisch, Wiley ISBN 978-1-118-32457-8, 2013. p. 456.

Hornbuckle, B. C. et al., "Effect of Ta solute concentration on the microstructural evolution in immiscible Cu—Ta Alloys.," JOM 67, 2802-2809 (2015).

Presentation titled "Creep Resistant Bulk Nanocrystalline Cu Alloys" authored by Chad Hornbuckle, Mageshwari Komarasamy, Kris Darling, Laszlo Kecskes, Tom Luckenbaugh, Scott Grendahl, Mansa Rajagopalan, Kiran Solanki, and Rajiv Mishra, presented at the 2016 TMS Annual Meeting, Nashville, TN, Feb. 15, 2016, by Dr. Chad Hornbucke.

K. A. Darling, M. Rajagopalan, M. Komarasamy, M. A. Bhatia, B. C. Hornbuckle, R. S. Mishra & K. N. Solanki, "Extreme creep resistance in a microstructurally stable nanocrystalline alloy," Nature 537, 378-381 (Sep. 15, 2016) doi:10.1038/nature19313 (Received May 4, 2016; Accepted Jul. 8, 2016; Published online Sep. 14, 2016).

"Nanotechnology may revolutionize future engines," ARL Inside, Sep. 19, 2016.

Koju, R.K., Darling, K.A., Solanki, K.N., Mishin, Y., Atomistic modeling of capillary-driven grain boundary motion in Cu—Ta alloys, Acta Materialia 148 (2018) 311-319.

* cited by examiner

Small Particles in the grains of the matrix

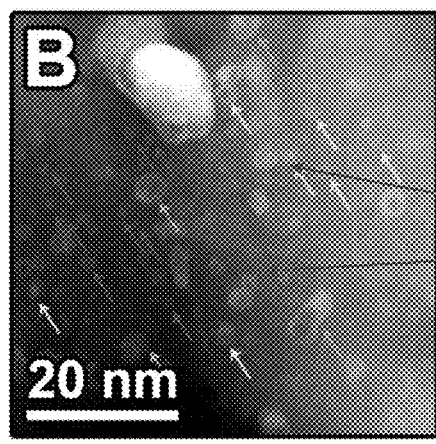

Arrows point to small particles

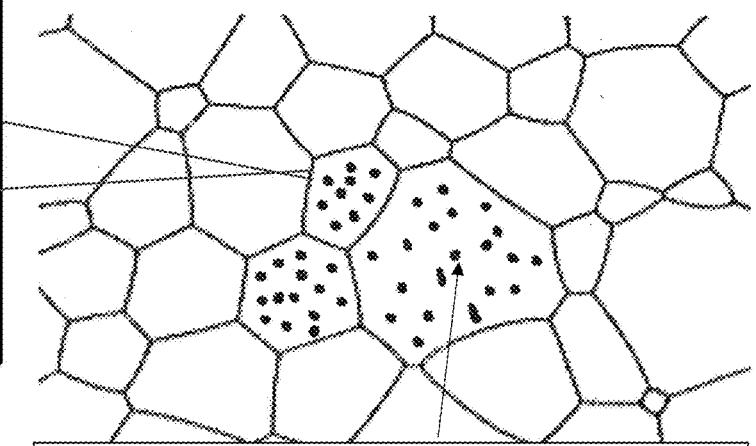

Small particles in the grains of the matrix.
The chemistry of these particles will contain the solute metals The frequency of the appearance will depend on the concentration of the alloying element and the degree of processing.

These smaller will be coherent and/or semi-coherent having diameters typically less than 20 nm.

FIG. 1A

Small Particles residing at the grain boundaries

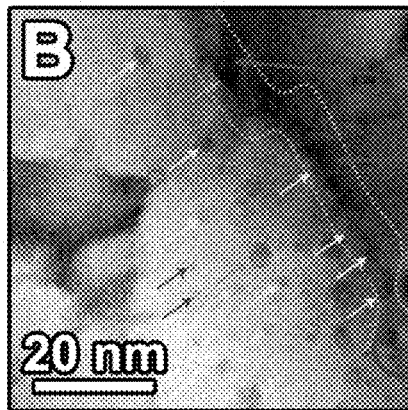

See image "F," below, for details within circle

Low magnification image showing particle along a grain boundary
The grain boundary is in between the dotted lines.

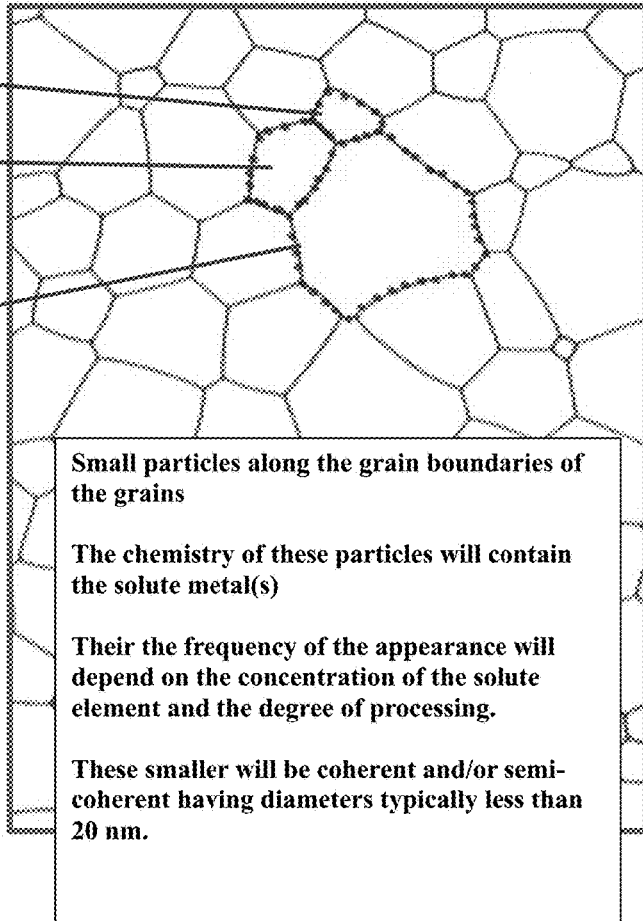

Small particles along the grain boundaries of the grains

The chemistry of these particles will contain the solute metal(s)

Their the frequency of the appearance will depend on the concentration of the solute element and the degree of processing.

These smaller will be coherent and/or semi-coherent having diameters typically less than 20 nm.

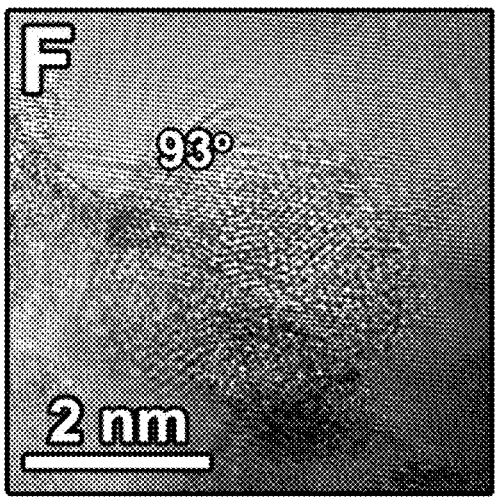

High magnification image showing a particle along a grain boundary (in circle above)

Arrows point to small particles

FIG. 1B

A. Particle embedded in a grain of the matrix with ideal coherency (i.e. no strained atomic bonds)

B. Coherent particle embedded in a grain of the matrix with negligible strained atomic bonds at the interface C. Semi-Coherent Particle embedded in a grain of the matrix D. Incoherent Particle embedded a grain of the matrix (a) (b)

EXTREME CREEP RESISTANT NANO-CRYSTALLINE METALLIC MATERIALS

RELATED APPLICATION DATA

This application claims the benefit of U.S. Provisional Patent Application No. 62/459,243 filed on Feb. 15, 2017, the disclosure of which is hereby incorporated by reference in its entirety for all purposes.

GOVERNMENT INTEREST

Some of the research underlying the invention was supported by the U.S. Army Research Laboratory under contracts W911NF-12-2-0018, W911NF-15-1-0077, and W911NF-15-2-0038.

The invention described herein may be manufactured, used, and licensed by or for the United States Government.

BACKGROUND OF THE INVENTION

I. Field of the Invention

The present invention relates generally to creep resistance of materials, and more particularly to, extreme creep resistant nano-crystalline metallic materials and their fabrication.

II. Description of Related Art

Nanocrystalline (NC) metals with a mean grain size below 100 nm have superior room temperature strength in part due to a large reduction in grain size. However, this high strength generally comes with dramatic losses in other properties, such as creep resistance, which limits their practical utility. For instance, the creep rates in NC-Cu are about four orders of magnitude higher than typical coarse-grained Cu. The significant degradation in creep resistance of NC-materials is in part due to an increase in the large volume fraction of grain boundaries (GBs), which lack long range crystalline order and lead to GB diffusional processes such as diffusional creep, sliding and/or rotation.

Historically over the past 50 years, the reduction/elimination of intrinsic topological defects (grain or cell boundaries) has been central to the design of creep-resistant materials, i.e., current designs enhance high temperature creep performance through the use of single crystal alloys, e.g., Ni-based, single crystal superalloys. Therefore, nano-grained materials having grain sizes 7-8 orders of magnitude smaller along with GB volume fractions 5-6 orders higher than those in the currently used superalloys have never been considered viable for high temperature creep applications. Moreover, NC-metals exhibit microstructural instability, i.e., grain growth (diffusional processes such as diffusional creep, sliding and/or rotation) at moderately low and sometimes even room temperature and/or in combination with deformation. Consequently, prior creep studies on NC-metals have reported creep stress exponents of 1-3 resulting from grain size effects on diffusional (Coble) creep.

SUMMARY OF THE INVENTION

Novel metallic systems and methods for their fabrication providing an extreme creep-resistant nano-crystalline metallic material are disclosed.

According to embodiments, an extreme creep-resistant nano-crystalline metallic material comprises: a matrix formed of a solvent metal with crystalline grains having diameters of no more than about 500 nm, and a plurality of dispersed metallic particles formed on the basis of a solute metal in the solvent metal matrix and having diameters of no more than about 200 nm. The particle density along the grain boundary of the matrix may be as high as about 2 $nm^2$ of grain boundary area per particle so as to substantially block grain boundary motion and rotation and limit creep at temperatures above 35% of the melting point of the material.

In the material, the solvent metal may comprise about 50 to 99.9 atomic percent (at. %) of the material, and the dispersed metallic solute metal may comprise the remainder, i.e., 0.1 to 50 atomic percent (at. %) of the material. In some embodiments, the solvent metal may comprise copper (Cu) or a copper alloy, and the solute metal may comprise one or more solute metals, for example, selected from the group consisting of: chromium (Cr), vanadium (V), niobium (Nb), tantalum (Ta), iron (Fe), cobalt (Co), molybdenum (Mo), tungsten (W), osmium (Os), antimony (Sb), cadmium (Cd), manganese (Mn), titanium (Ti), zirconium (Zr), hafnium (Hf), scandium (Sc), yttrium (Y), and strontium (Sr). In some instances, at least some of the particles may comprise one or more solute metals and may contain additional elements, such as oxygen (O), nitrogen (N), carbon (C), sulfur (S) or other trace elements (i.e. from the remainder of the periodic table), with the total amount of the trace element(s) generally not exceeding 1 at % of the material; O, N, C and S may be higher in concentration such as 20-30 at. % or even higher. The particle number densities within the volume of material may be in the range of $10^{15}$ to $10^{30}$ per cubic meter.

The creep rate may be less than $10^{-6}$ $s^{-1}$ at greater than 35% of the melting point of the material. More specifically, the creep rate may be less than $10^{-6}$ $s^{-1}$ at greater than 20% of their respective yield point values at temperatures greater than 35% of the melting point of the material.

Various types of particles may be present in the materials, with at least some of the particles being coherent particles having diameters less than about 5 nm, semi-coherent particles having diameters between about 5 and about 20 nm, and/or incoherent particles having diameters in excess of about 20 nm and no more than about 200 nm.

The solute metal may comprise at least 0.1 atomic percent of the material so as to limit rotation of grains to no more than about 30 degrees. The material may have a room temperature yield strength in the range of 300 to 2000 MPa and a room temperature compressive ductility greater than 3% or a tensile ductility of at least 0.5%, for instance.

According to embodiments, a process for forming an extreme creep-resistant nano-crystalline metallic material may include: subjecting metals of the solvent metal and the at least one solute metal to a non-equilibrium processing technique so as to produce: a matrix formed of a solvent metal or alloy with crystalline grains having diameters of no more than about 500 nm, and a plurality of dispersed metallic particles formed from a basis of the solute metal in the solvent metal matrix and having diameters of no more than about 200 nm. The particle density along the grain boundary of the matrix may be as high as about 2 $nm^2$ of grain boundary area per particle so as to substantially block grain boundary motion and rotation and limit creep at temperatures above 35% of the melting point of the material. The non-equilibrium processing technique may comprise milling/machining (including ball milling), melt spinning, spray atomization, inert gas condensation, solution precipitation, physical vapor deposition, and electrodeposition. Both high-energy and low-energy milling devices might be used. These embodiments thus provide a methodology for forming a new class high creep resistance nano-crystalline metallic alloys or composites in bulk form.

These and other embodiments of the invention are described in more detail below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

FIGS. 1A, 1B and 1C show additional features and details of the cage structure.

DETAILED DESCRIPTION

Figure 1:
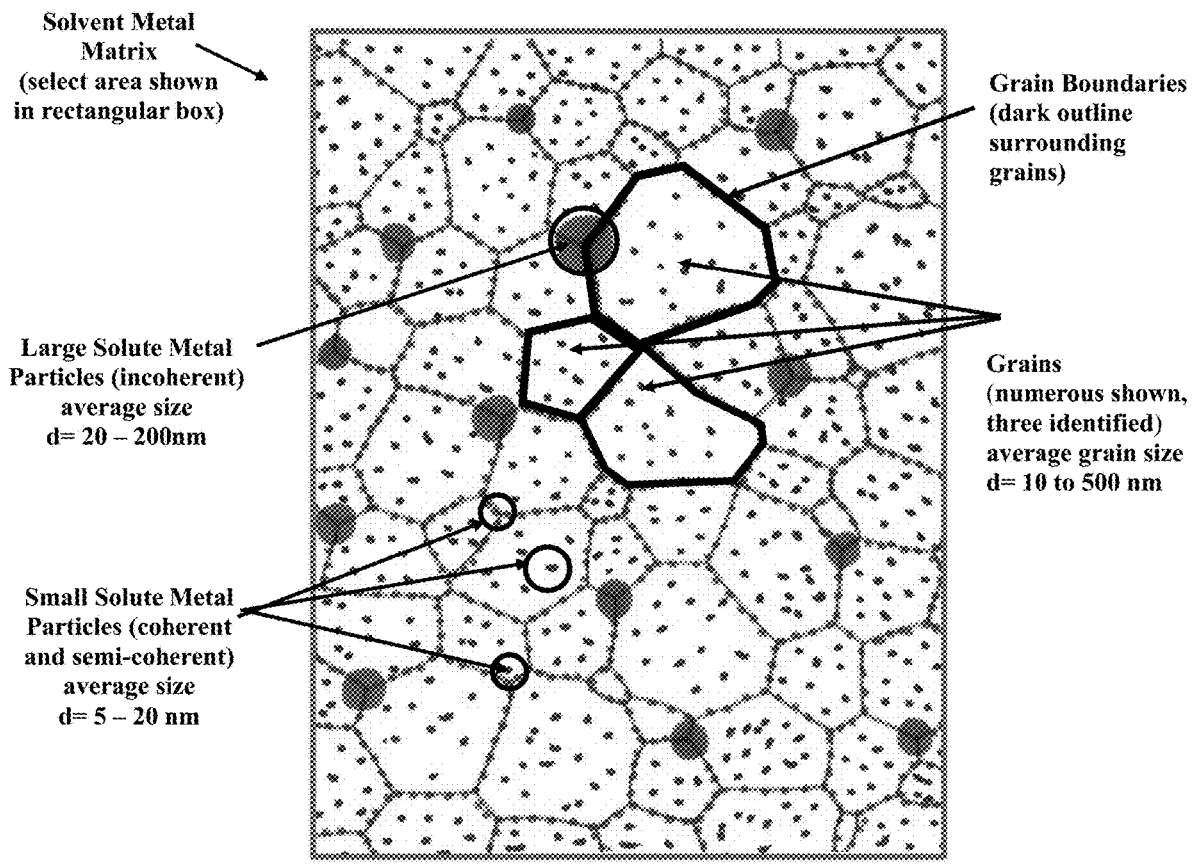
FIG. 1 illustrates a simplified schematic of an interlocking immobile cage structure for extreme creep-resistant nano-crystalline metallic materials according to embodiments of the present invention.

Novel metallic systems and methods for their fabrication provide an interlocking nano-scale substructure in metal and alloyed systems which provide extreme creep-resistant nano-crystalline metallic materials. The underlying substructure phenomenon entails the uniform dispersion of small fragments of one or more low diffusivity metals (solute) in another metal (solvent), whereby their immobility causes the mobility of the grain boundaries of the solvent grains to be prevented. The nano-scale dispersion of the solute creates obstacles in the path of diffusing point and line defects that essentially shut down the underlying mechanisms for creep to take place. In turn, these nanoscale grains give rise to unprecedented properties, including high-temperature creep resistance properties. An exemplary Cu:Ta alloy system is described; however, the selection, design, and fabrication methodology are not limited to this particular material system, and the advantageous results are believed to extend to many other nano-crystalline metallic materials.

Experimentation reveals that when the metallic material is in bulk form it may have a compressive flow stress at quasi-static strain rates of 0.8 GPa and ductility of at least 20%, and a tensile flow stress at quasi-static strain rates of at least 0.6 GPa and ductility of at least 10%. Additionally, the metallic system in its bulk form, subjected to a stress level of 100% of the yield stress at 0.5 $T_m$ (400° C.), may have a steady state creep rate less than $10^{-6}$ $s^{-1}$ (which is 6-8 orders of magnitude lower than almost all NC-metals) at various homologous temperatures between 0.5 and 0.64 $T_m$ ($T_m$ is the melting temperature of the matrix/solvent) under an applied stress range of 0.85% to 1.2% of the shear modulus. This is a paradigm-shift in the creep response of NC-materials with unprecedented property combinations, i.e., high strength with extremely high temperature creep resistance.

The unusual combination of properties may be achieved through non-equilibrium processing which creates distinct grain boundary-pinning particles that favor kinetic stability of grains, i.e., the retention of nano-sized grains under extremely long-term creep conditions. This enables the development of a new class of structural materials and alloys with both high strength and creep resistance. The novel materials may be suitable for a wide variety of high temperature applications, including those in the aerospace, naval, civilian infrastructures and energy sectors.

I. High Temperature Creep

The phenomenon of creep is the long-term, time-dependent, flow or deformation of a material subjected to a constant stress, especially at high temperatures. Typically, during creep, the applied stress levels are below the yield stress of the material, however, given the right combination of time, temperature, and stress, the extent of deformation can be large enough to lead to failure of the part. Because creep occurs slowly, the plastic strain in the material builds up gradually. As expected, the onset of creep is strongly dependent on the temperature relative to the material's melting point. That is, once a certain temperature is exceeded, typically, 0.5 of the melting point temperature or above (and, closer the temperature is to the material's melting point), the greater the resultant creep deformation will be.

In most monolithic crystalline metals and alloys, creep occurs in three stages. During the first stage, or primary creep, the creep strain rate is variable, initially high, decreasing to a roughly constant value and steady state conditions are attained. This second stage, or steady state creep, is characterized by a primary deformation mechanism and, as such, the applied stress can be related to the resultant strain via a series of analytical or empirical relationships. The final stage, or tertiary creep, involves a renewed rapid increase in the creep strain rate, which is caused by the onset of gross deformation resulting in the inevitable failure of the material.

Several theories exist to account for the creep behavior of metals and alloys. Generally, the creep strain, which is a strong function of temperature and the applied stress level, is related to temperature via an Arrhenius type exponential function, and related to stress via a conventional power-law function. Usually, the magnitude of the creep exponent ranges between 1 and 8. In certain materials, the exponent can be even higher.

In coarse-grained crystalline materials, creep mechanisms usually entail the individual or collective movement of atoms and line defects; that is, either by diffusion- or by dislocation-based mechanisms. In the former, such as that occurring during Coble creep, depending on the actual mechanism, individual atoms can move either through the bulk of the crystalline solid or along the grain boundaries between crystalline grains. In contrast, in the latter, dislocations can climb around obstacles or glide through the crystal lattice. Regardless, the measure of the extent of creep, as revealed by the creep exponent, usually has a value of 1 or is linear for diffusion-based processes; whereas, for dislocation-based processes, the creep exponent tend to be larger, between 3 and 6.

An overlooked factor in the aforementioned creep strain relationship is the role of the material's grain size. As the grain size of the material decreases, especially, into the nano-scale regime, its role can become quite important in dictating which deformation mechanisms will be active to accommodate the applied stress. Specifically, with decreasing grain size, the grain boundary volume in the bulk increases dramatically. It is important to recognize that, unlike the ordered structure of the grain interiors, the grain boundary volume will have a mostly disordered structure. And, while it will lead to extraordinary properties not seen in conventional materials, in turn, the role of this grain boundary volume will dominate the behavior of the material.

A crystal structure free of the pathways (e.g., topological defects and flaws) that would disallow the movement of atoms or line defects, in turn, would result in a very high creep resistance. Such are the class of single crystal superalloys. However, unlike these single crystals, monolithic nano-crystalline and nano-structured materials, due to the ease of dislocation movement through and within the disordered grain boundary region, have very poor creep resistance. Typically, this class of nano-grained materials have creep rates which are three to four orders of magnitude higher than those of the coarse-grained counterparts.

In response to this seemingly detrimental structural change, considerable research efforts have been conducted to alter the number of available pathways accommodating mobile atoms or dislocations under the applied stress. That is, it has been hypothesized that depending on the exact character of these grain boundary regions, the ease of atom or dislocation movement could be unaffected and, under those conditions, the grain size will have little or no effect on the dominant creep mechanism. However, if the movement of atoms and dislocations could be impeded or controlled more effectively, then the creep resistance can be significantly improved.

Another critical factor in determining the creep behavior of the nano-structured material stems from the inherent instability of the fine-scale structure of this class of materials. This is because, with increasing temperature, unless their grain-size is stabilized, nano-crystalline and nano-structured materials will undergo rapid grain growth or coarsening, which will affect the local crystalline environment and thus the creep behavior.

Further, most structural materials are not monolithic. For the purposes of imparting a particular set of properties, materials are created to consist of a plurality of phases. Specifically, they consist of a primary phase and, a number of secondary, tertiary or other phases. Effectively, the introduction of the phases alter the grain boundary characteristics of the material. More specific to the spirit and the purpose of this invention, the nature and intent of these phases, introduced in the form of clusters, precipitates, and other substructures, are to alter, affect, and impede the movement of atoms, dislocations or grain boundaries in the bulk solid. In turn, the relative merit and their role in modifying the underlying creep mechanism will be apparent in the subsequent description.

The response can be attributed to a specific creep resistance interlocking nano-crystalline grain size and immobile nano-scale cage structure.

II. Interlocking Immobile Cage Structure

Various methods may be used to induce both thermal and structural stabilization by dispersing one species in another. What differentiates one stabilization method from the other is how, and to what extent, the solute species is dispersed in the form of particulates or solute atoms. More specifically, the kinetic mode (e.g., Zener pinning) uses particles, whereas, the thermodynamic mode uses atoms and atom clusters for the stabilization process. Moreover, the extent of stability is dependent on the selection of the constituents in the sense, once they are forced to form a solution, will they retain this state indefinitely.

The traditional definition of an atom is the smallest subdivision in which a particular element still retains its unique characteristics and can be distinguished accordingly from another element. In contrast, particles may consist of individual grains or subgrains, which, in turn, could be made up of hundreds of atoms up to billions of atoms. The stabilization process, either kinetic or thermodynamic, entails emplacing the solute species, ranging in size from atoms to grains to particles, and inserting them into the sub-structure of the solvent. In a liquid, the solute and solvent species are randomly distributed, however, in the solid state, the solute can be emplaced at the atomic level directly into the crystal lattice of the solvent, and/or along grain or subgrain boundaries between crystals of varying sizes. In kinetic stabilization or pinning, the solute species is more of an obstacle preventing the free movement of grain boundaries, while in thermodynamic stabilization, the role of solute species is to alter the energy landscape to a much greater extent.

More specifically, on an atomic level, atoms can be forced into a metastable random solid solution or potentially occupy defect sights such as dislocations, triple junctions, and grain boundaries. This process is critical for setting up thermodynamic stabilization. The breakdown occurs due to the collisions of the particles during non-equilibrium processing, for instance, with the walls of the vial and the balls in ball milling. The energy deposited by the impact of the milling balls is sufficient to displace the atoms from their crystallographic positions. On a microscopic level, the particles fracture, aggregate, weld, and re-fracture causing the evolution of a heavily worked substructure in the milled powers.

Generally, in fine particulate materials, especially those with nano- to submicrometer sizes, there is an extremely large driving force to reduce the relative ratio of surface to volume area or surface to volume energy. This driving force is thermally activated and, therefore, occurs more efficiently at higher temperatures. The movement of particle or grain boundaries, causes fine particles or grains to coalesce, merge, and grow into larger particles or grains. If the temperature is near or in excess of 50% of the melting point of the material, this process is referred to as sintering. In addition to heat, if pressure could be applied to improve the sintering process, more rapid densification would occur, further eliminating voids between the particles. If diffusion distances could be kept at a minimum, uninterrupted species transport could then be allowed. While some of the coarsening can be controlled by careful adjustment and selection of sintering conditions (i.e., an optimization and manipulation of the three dimensional processing surface of time, temperature, and pressure), the coarsening is unavoidable.

Conversely, once the atomic level intermixing occurred, if the relative diffusivities of the constituents are slow, sluggish, or extremely slow, the particle (cluster), precipitates and defects will be rendered immobile in the host species. This fact is critical in the design step of this class of materials and alloys. That is, if one species can be distributed in another species, such that the relative positions of the former do not change with temperature or other externally introduced variables, it can essentially prevent any or all mechanisms for their redistribution within the structure. Looking at the distribution of these nano-scale defects in another way is that they essentially form a multiscale grid-like pattern in three dimensions, whereby, they prevent any possible mechanical motion of the nano-crystalline and nano-structured solvent grains, that would occur either by atomic rearrangement, sliding, or rotation into a more favorable position to relieve the meta-stability, more precisely, the unfavorable higher energy state of the composite material.

FIG. 1 illustrates a simplified schematic of an interlocking immobile cage structure for extreme creep-resistant nano-crystalline metallic materials according to embodiments of the present invention. Nano-crystalline means a crystallite material which is a nano-sized grain structure (i.e., on the order of 1, 10 or 100 nm; less than about 1 micrometer). This may include ultra-fine particles which are typically defined as being sized between 100 and 1000 nm.

The cage can be thought of as an arrangement or network of fine scale precipitate particles in a bulk solid wherein the two components (solute and solvent species, respectively) form an interlocking structure.

The material is comprised of a matrix formed of a solvent metal or alloy and at least one solute metal or alloy dispersed therein. Metal, as used herein, may mean one or more elemental metals, mixtures and/or alloys (including intermetallic phases) thereof. Additives, such as trace elements may also be included.

Various binary, ternary, and higher order nano-crystalline and nano-structured metallic systems are described herein according to embodiments of the invention. According to these embodiments, the binary, ternary, or higher order nano-crystalline and nano-structured metallic system consist of solvent and solute phases. By design, the solute phase is imparted with a characteristic dispersion, distribution, morphology, and size or dimension within the solvent such that it affects the high temperature mechanical properties of the overall system.

In general, the solvent metal comprises 50 to 99.9 atomic percent (at. %) of the material, and the dispersed metallic solute metal comprise 0.1 to 50 atomic percent (at. %) of the material. The solvent metal may be a pure elemental metal or alloy thereof. In some embodiments, the solvent metal be copper (Cu) or a copper alloy, for instance. Also, the solvent metal may comprise more than one elemental metal or alloy, in some instances.

The solute metal may be one or more metals (or alloys thereof) which are ordinary immiscible in the solvent metal. The solute metal(s) may have positive enthalpy mixing values with Cu, such as: chromium (Cr), vanadium (V), niobium (Nb), tantalum (Ta), iron (Fe), cobalt (Co), molybdenum (Mo), tungsten (W), osmium (Os), antimony (Sb), cadmium (Cd), manganese (Mn), or the like. Alternatively or additionally, they may have negative enthalpy mixing values with Cu, such as: titanium (Ti), zirconium (Zr), hafnium (Hf), scandium (Sc), yttrium (Y), strontium (Sr), or the like. Both the negative and positive enthalpy mixing elements have zero or very little solubility in Cu.

The matrix has a lattice structure and formed of a multitude of grains. Grains are comprised of atoms or some particle having the same crystalline (or sub-crystalline) structure. On a nano- and micro-scopic level, creep is facilitated by the gradual rearrangement of the local nanostructure when atoms and vacancies move along the grain boundaries of adjacent grains, or subgrains.

More particularly, each grain is formed of solvent metal atoms of a substantially singular crystalline lattice structure (crystallite), such as FCC or BCC, depending of the solvent matrix metal. The portion of FIG. 1 represents the matrix. It forms the medium of the metallic material. It may be Cu or a Cu-based alloy, for instance. While not truly circular (and actually, of a more random polyhedral shape/cellular polygonal shape), grains are assumed to have an average size or diameter. The grains of the matrix have diameters of no more than about 500 nm, and typically ranging from about 10-200 nm. Grain boundaries occur at the interface of separate adjacent grains.

A plurality of dispersed metallic particles formed of solute metal(s) are present in the solvent metal matrix. The dispersed solute particle reside within grains and along the grain boundaries. They typically have average diameters of no more than about 200 nm. The particles number densities within the volume of material is generally within the range of $10^{15}$ to $10^{30}$ per cubic meter within the matrix. This range equates to an extraordinary high density. At least some of the particles may further contain additional element(s) such as oxygen (O), nitrogen (N), carbon (C), sulfur (S) or another trace element(s) (i.e. from the remainder of the periodic table). For example, O, N, C or S may constitute 20-30 at. % or even a higher percentage of the material, whereas the total composition of the trace elements (other than O, N, C or S) should not exceed about 1 at. % of the bulk composition. Additionally, in some instances, due to processing or otherwise, the particles may comprise solute metal along with some small amount of the solvent metal or alloy (such as Cu).

Figure 1C:
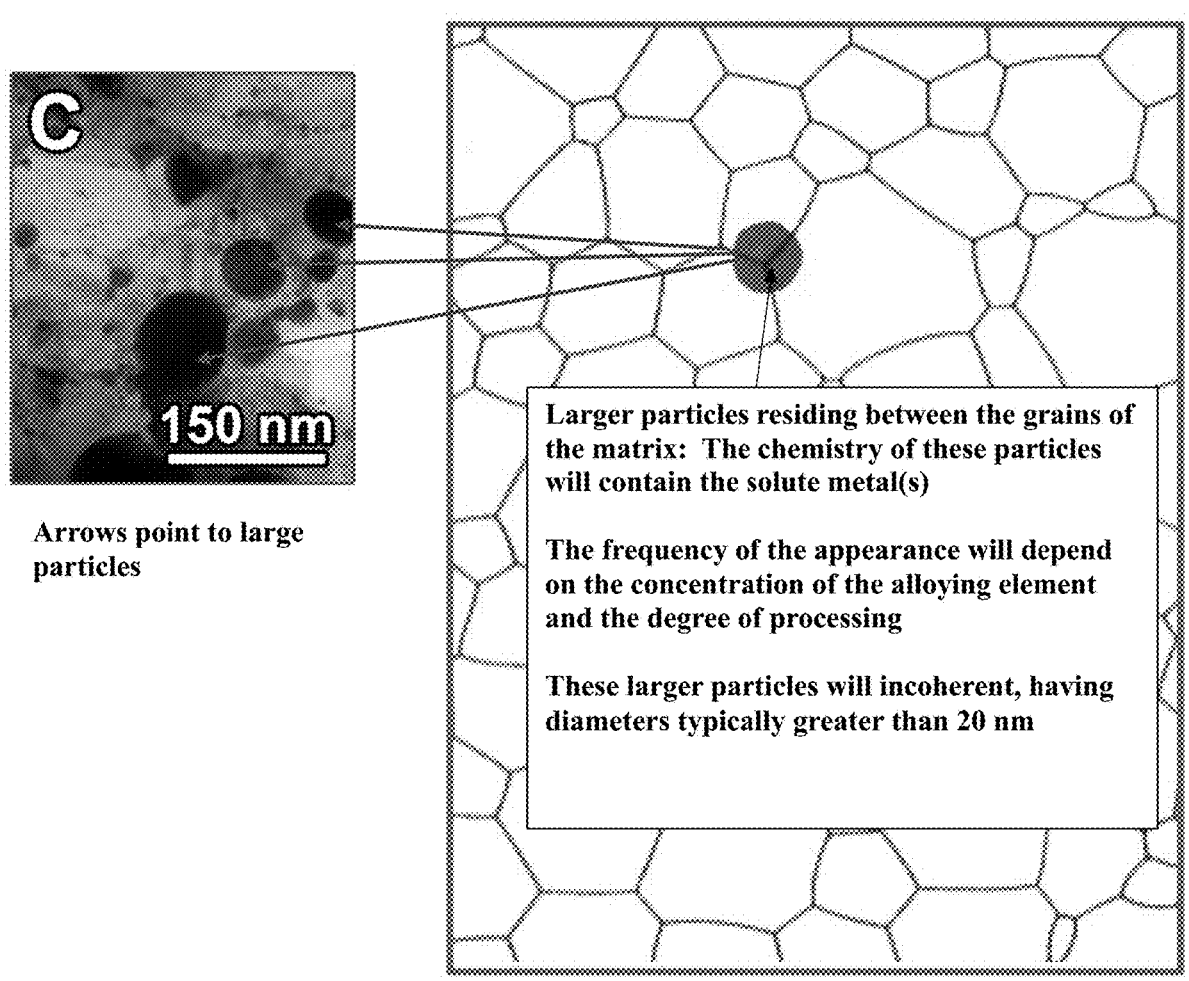

Particles may be characterized as being small (coherent or semi-coherent) or large (incoherent) based their size. The small particles have diameters typically less than 20 nm. They reside within the grains and/or on the grain boundaries, as further depicted in FIGS. 1A and 1B. FIG. 1A also includes a bright-field STEM (BF-STEM) image, labeled "B", highlighting the high density of nano-particles of various sizes. The different arrows designate the sizes of the different coherent/semi-coherent particles (i.e., ~1 nm, ~2.5 nm, and ≥4 nm radius). And FIG. 1B includes a high-resolution BF-STEM image, labeled "B" showing the bowing of the grain boundary (dashed lines) as it interacts with tantalum particles, and a magnified image of the circled portioned of the grain boundary, labeled "F", further detailing a 3-nm-diameter particle residing at a high-angle (93°) grain boundary. The arrows correspond to the direction of lattice planes of the copper matrix. Large particles reside between the grains of the matrix as further depicted in FIG. 1C. This figure also includes a TEM of the exemplary Cu-10Ta (at. %) material, labeled "C", showing the large particles in an actual material. The chemistry of these particles will contain the solute metal(s). These larger particles will be largely incoherent, having diameters typically greater than 20 nm. The frequency of the appearance of small and large particle will depend on the concentration of the solute metal(s) and the degree of processing.

Figure 2:
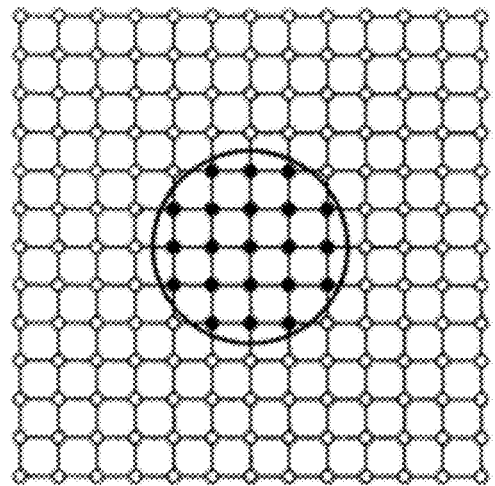
FIG. 2 shows various degrees of particle coherency with respect to an exemplary grain.
Figure 2:
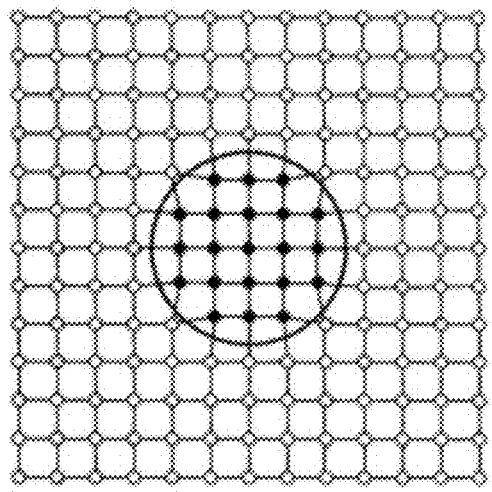
Figure 2:
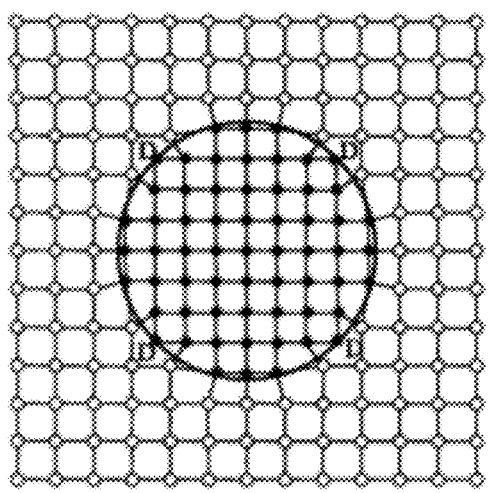
Figure 2:
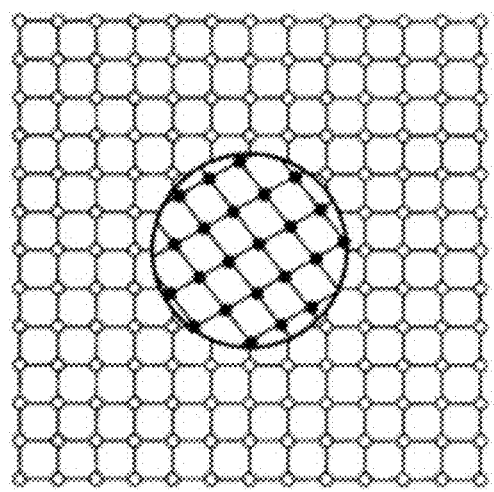

FIG. 2 shows various degrees of particle coherency with respect to a grain. Each grain of the matrix has a distinct lattice parameter/atomic spacing, which the particle(s) dispersed therein affect. One exemplary, representative grain is depicted in each of the sub-figures with an embedded particle (depicted as a circle) with different degrees of coherency. Coherency is described by the amount of strain energy required to maintain structural continuity across the interphase between the matrix and particles, i.e., perfect lattice matching. Sub-figure A shows the particle embedded in the grain with ideal coherency (i.e., no strained atomic bonds). Coherent particles have near-perfect coherency (i.e., negligible strained atomic bonds) with respect to the lattice of the grain, as shown in sub-figure B. The strain energy to maintain this coherency can range from zero to a level at which threading dislocations are introduced at the interface as to relieve the strain energy and maintain some partial level of continuity, i.e., lattice matching. See e.g., Mineral Science by Andrew Puntis Cambridge University Press 2003, ISBN 0 521-41922-0, pg. 336 & Materials Science and Engineering "An Introduction" William D Callister Jr. and David G Rethwisch, Wiley ISBN 978-1-118-32457-8, pg. 456, herein incorporated by reference.

It is well-known that a coherent particle can lose coherency upon coarsening above a critical diameter. This happens when the elastic energy with the coherent particle becomes large and it is energetically favorable for a dislocation to form at the matrix-particle interface. At this point, as shown in sub-figure C, the particle is considered semi-coherent. It lies between having structural continuity across the interface between the matrix and particles (i.e., of a coherent particle) and where the number of threading dislocations are so numerous that their core structures overlap (i.e., of an incoherent particle). The latter condition is shown in sub-figure D.

The amount of strain energy and hence degree of coherency is strongly dependent on the particle size and chemistry. The degree of coherency will be variant based on composition, but for the one Cu—Ta binary metallic system investigated by the inventors, lattice strains in the range of 0 to 14% exist for coherent particles. Further, the energy of the interface between the Ta-based particle and the Cu matrix can be used to quantify the type of coherency of these particles, and the range of the particles sizes which correspond to them. Characterizing the coherency at room temperature has indicated that the Cu—Ta based system has coherent particles when the particular diameter is less than 3.898 nm, and semi-coherent particles when their diameters are between 3.898 to 15.592 nm. Both coherent and semi-coherent particles form inside the grains and along the grain boundaries. Particles having diameters in excess of 15.592 nm (and up to 48.728 nm) are considered incoherent. The larger incoherent particles typically only form along the grain boundaries in the matrix.

Figure 3:
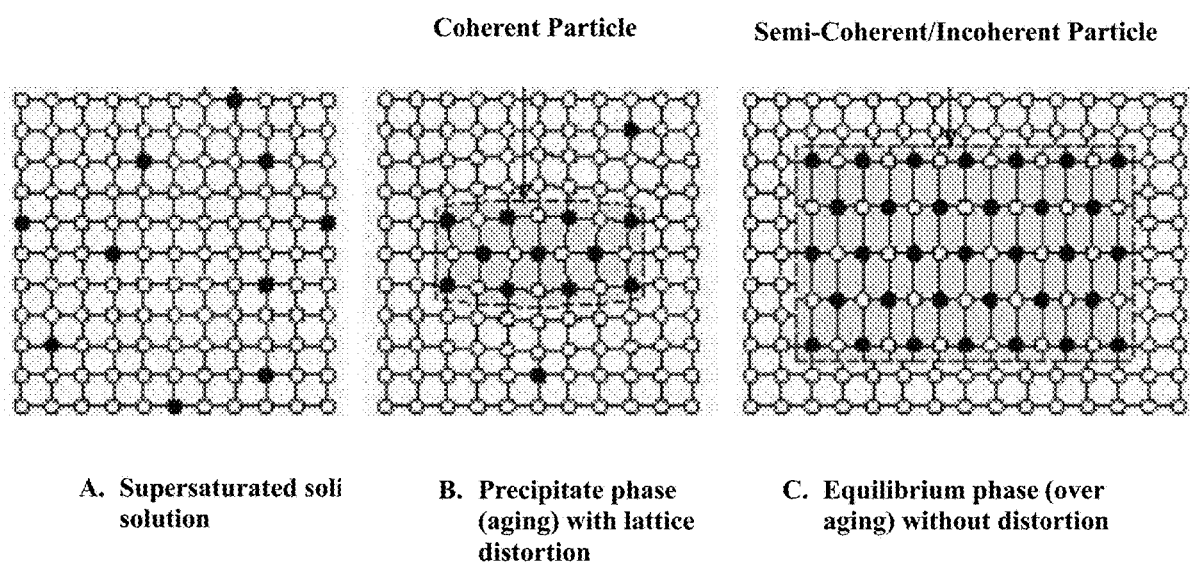
FIG. 3 shows formation of solute metal particles (coherent to incoherent) for a solid solution in a solvent metal matrix.

FIG. 3 shows formation of solute metal particles (coherent to incoherent) for a solid solution in solvent metal matrix. In the sub-figures, the white dots represent the solvent or matrix/lattice atoms and the black dots represent solute atoms. The solute metal atoms form the dispersed secondary phases, which become the particles. More particularly, the images show that, from the precipitation of a supersaturated solid solution (sub-figure A), a coherent particle (sub-figure B) initially forms, and can continue to evolve into a semi-coherent and or incoherent particle (sub-figure C) with time and temperature.

Most relevant to the underlying concept of this invention is the primary aspect or multiscale nature of the resultant structure. As illustrated in FIG. 1, the size of the solute atom species features span several sizes: large and small particles. This implies that, for any given level of dispersion of the solute atoms and their particles in the solvent, their length scales can easily range from nano- to micrometers. With a controllable distribution within grains and along grain boundaries of the solvent, these solute asperities can thus alter the overall properties and behavior of the resultant material. That is, if selected appropriately, the low mobility of the solute species could readily lead to a blocking of most if not all operating and dominant deformation mechanisms at those corresponding length scales. For example, the migration of interstitials and vacancies could be shut down at the atomic level by the presence of fine scale particles along grain boundaries. Likewise, larger precipitates can interfere with the motion of dislocations and disclinations in the solid.

Moreover, because of the thermal stability of the composite structure, the high temperature properties would be essentially unchanged from those at low temperatures, or be only slightly different.

The remarkable creep resistant properties of this material are due to the particle density along the grain boundaries of the matrix. The inventors conducted simulation by means of Large-scale Atomic/Molecular Massively Parallel Simulator (LAMMPS). These findings are detailed in the paper: Koju, R. K., Darling, K. A., Solanki, K. N., Mishin, Y., "Atomistic modeling of capillary-driven grain boundary motion in Cu—Ta alloys, *Acta Materialia* 148 (2018) 311-319, herein incorporated by reference. According to these simulations (see the last line in Table 1 in that paper), it was found that the critical particle density of one specific Cu—Ta composition corresponds to about 14 $nm^2$ of grain boundary area per particle. However, it is duly noted, that this simulation-calculated density only blocks the GB motion and grain rotation on the molecular dynamics (MD) simulations timescale. On the experimental time scales, however, the density must be larger. It is hard to evaluate how much larger, but a factor of two or seven would be a reasonable estimate, giving a range of about 2-7 nm$^2$ of GB area per particle. (Note: 7 nm$^2$ per particle is actually a lower density than 2 nm$^2$).

Nonetheless, it is believed that, when the particle density along the grain boundary of the matrix is high, such as about 2 nm$^2$ per particle, the particles are able to substantially block grain boundary motion and rotation and limit creep at elevated temperatures (e.g., temperatures above 35% of the melting point of the material; the value may be defined as a ratio of the temperature in question and the melting point of the base metal or alloy both being defined in the Kelvin scale). It is again noted that a larger grain boundary surface area of the particle equates to lower density per particles.

III. Exemplary Cu—Ta (at. %) Metallic Material Systems

One exemplary immiscible Cu-10Ta (at. %) alloy system specifically investigated by the inventors demonstrates a creep response with an unprecedented combination of properties, i.e., high strength and extremely high temperature creep resistance. This material is able to achieve and retain high strength and creep resistance at a high homologous temperature of $0.64T_m \approx 600°$ C. (where $T_m$ is the melting temperature of the matrix), owing to its unique microstructural architecture.

Initially synthesized through high energy ball milling and subsequently consolidated via equal channel angular extrusion (ECAE), the as processed microstructure has an average Cu matrix grain size of 50±17.5 nm and a wide dispersion of Ta particle sizes, ranging from small atomic nano-particles (average diameter of 3.18±0.86 nm) to much larger precipitates (average diameter of 32±7.5 nm). It is known that such dispersions give rise to an extremely stable microstructure. For example, as compared to pure NC-Cu, which exhibits rapid grain growth to the micron-scale at just 100° C., Cu-10 at. % Ta powders had been previously reported to maintain a mean grain size of 167 nm after annealing at 1040° C. for 4 hours.

Figure 4:
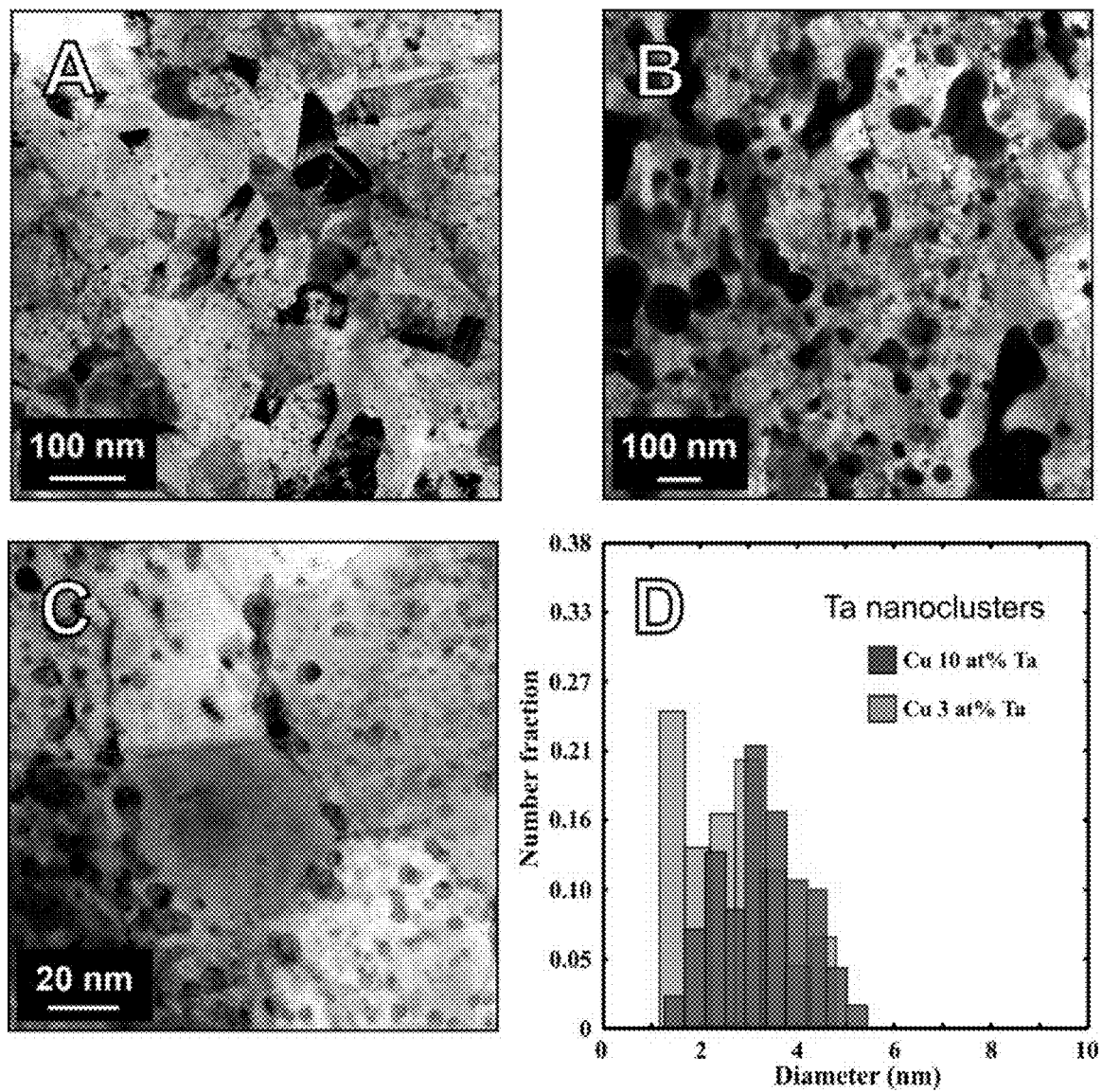
FIG. 4 includes representative images showing complete microstructure i.e., the matrix composed of nano-crystalline grains (Cu based) and particles (Ta based), for increasing concentrations of Ta.

FIG. 4 are representative images showing the complete microstructure i.e., the matrix compose of nanocrystalline grains (Cu based) and particles (Ta based), for increasing concentrations of Ta from 3 (images A and C) to 10 at % (image B). The larger Ta concentration caused the appearance of larger incoherent particles to form at a given temperature of 700° C. The histogram in image D shows the average particle size of the smaller particles for 3 and 10 at % Ta. The size distributions of Cu and Ta grains were determined from 300 grains.

Creep within the grain themselves is possible, however, significantly slower, limited by the availability of defects to facilitate atom movement. The faster this rearrangement or reshuffling can take place, the poorer the creep resistance of the material is. Further, if the grains are allowed to rotate or slide, their movement will accommodate and accentuate the individual motion and movement of atoms, vacancy adsorption, and the translation of dislocations by glide, climb, or other means.

The reasons for this high level of stability stems from the fundamental nature of the class of solvent-solute system which is controlled by selectively engineering its chemistry as well as through controlled processing. Specifically, the solvent and solutes by nature are immiscible, but, because their mixture was created and formed into a bulk by the exemplary solid-state high energy mechanical alloying and extrusion processes, the atoms of the solute species were forced into the solvent. Moreover, the intrinsic diffusivity of the solute in the solvent is extremely slow, whereby, the natural tendency to phase separate is further prevented. The combination of the dispersion of these solute atoms along grain boundaries and within the nano-scale grains prevents the movement of any crystallographic features to separate the two phases from one another.

Figure 5:
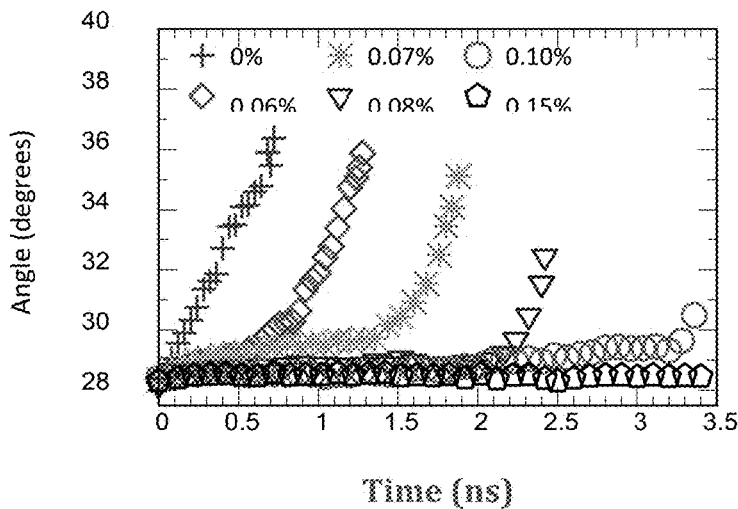
FIG. 5 is a plot of rotation of grains for varying solute metal concentrations.

FIG. 5 is a plot of rotation of grains for varying solute metal concentrations. Where the angle increases as a function of time, this evidences that the grains are rotating. As generally shown, when the solute metal is at least 0.1 atomic percent of the material it limits rotation of the grains to no more than about 25 degrees.

The unusual combination of mechanical properties of this class of immiscible alloys, such as Cu-based alloys, and more specifically, Cu-10Ta (at. %), is achieved through the existence of a distribution of grain boundary pinning nanoparticles. These pinning nano-particles may be produced, for example, through a powder metallurgy-based processing route that favors the kinetic stability of grains, i.e., the retention of nano-sized grains at extremely high elevated temperatures. It is expected that other exemplary immiscible systems would behave in a similar manner.

The ability to fabricate and process such alloys enables the development of a new class of structural metallic systems and alloys with high strength and creep resistance for a wide variety of high temperature load bearing applications in the aerospace, naval, and civilian infrastructure and energy sectors.

The conventional design of creep-resistant materials dictates reductions in intrinsic topological defects (i.e., grain or cell boundaries). Such designs enhance the high temperature creep performance via perfecting the crystal structure by the use of single crystal alloys. In comparison, to single crystals, nano-grained materials having grain sizes 7-8 order of magnitude smaller, coupled with grain boundary volume fractions 5-6 orders of higher, one would not expect a nano-material to be viable for high temperature creep applications. Further, conventional nano-crystalline metals and alloys exhibit microstructural instability, i.e., onset of rapid grain growth, (which are diffusional processes, e.g., grain boundary sliding and/or rotation) observed at moderately low, sometime as low as room temperature. Prior creep studies of nano-structured metals have reported creep stress exponents of 1-3, indicative of diffusion-based creep mechanisms.

Figure 6:
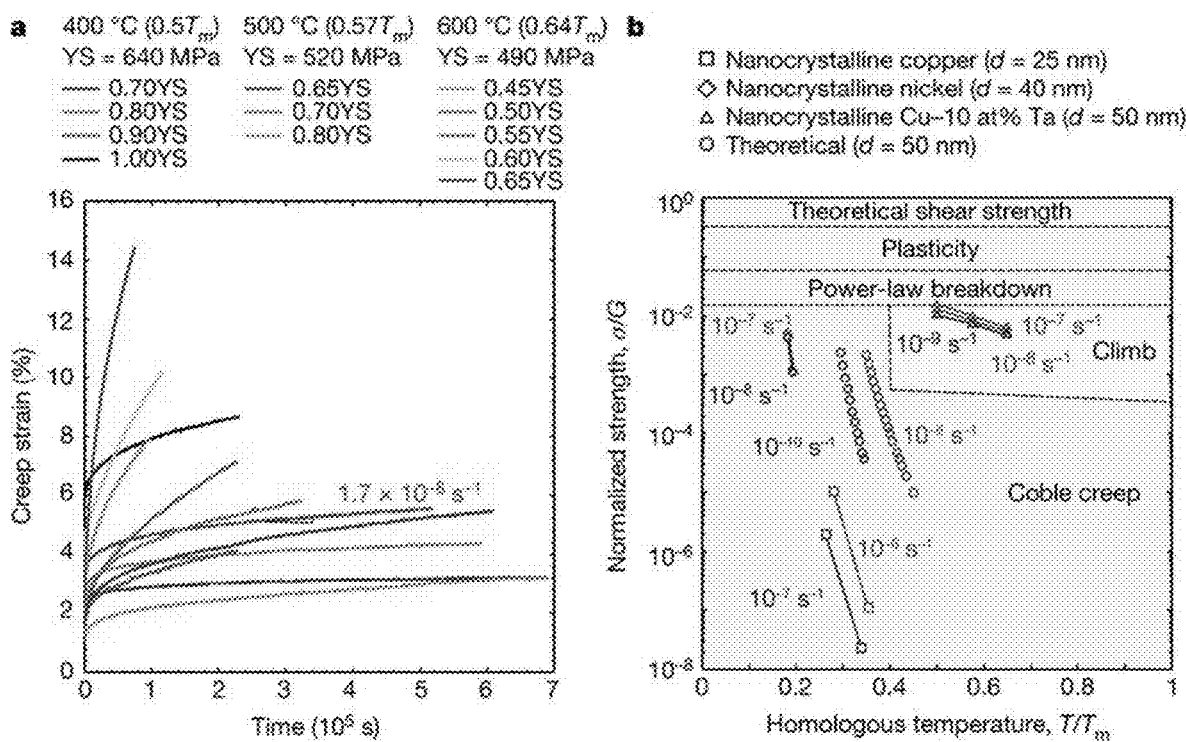
FIG. 6 shows the compressive creep response of NC-Cu— 10 at. % Ta, where the left plot (a) shows the conventional creep strain versus time curves for various applied temperatures and constant stress conditions, and the right plot (b) is a theoretical deformation mechanism map of a NC-Cu with an average grain size of 50 nm along with recently published experimental creep rates for NC-Cu and NC-Ni plotted in stark comparison to our work on NC-Cu-10 at. % Ta. The theoretical constant Coble creep rate lines for a grain size of 50 nm (circled) are also provided.

FIG. 6 shows a summary of the results of the compression creep tests on the exemplary Cu-10 at. % Ta material. Compression creep tests were conducted over a wide range of applied stress and temperature conditions. The compression creep strain evolution curves shown in plot (a) consist of the primary creep region, where the creep strain rate decreased with time, and the secondary creep region, where the creep strain rate remained steady state.

The steady state creep rates ($\dot{\varepsilon}$) in NC-Cu-10 at. % Ta were all found to be less than $10^{-6}$ s$^{-1}$ at various homologous temperatures between 0.5 to 0.64 $T_m$ under a stress range of 1.2% to 0.85% of the shear modulus. Note that the creep rates reported for NC-Cu-10 at. % Ta are minimum creep rates. These fractions of the shear modulus equate to stress values of 576 and 319 MPa, which surprisingly represent 90% and 65% of the at-temperature (400 and 600° C.) yield strength, respectively. The yield stress values at various temperatures were quantified using a series of quasi-static compression tests with a strain rate of $8 \times 10^{-4}$ s$^{-1}$. To further demonstrate the extreme improvement in the creep resistance, a creep test was also performed under 100% of the yield stress at 0.5 $T_m$ (400° C.), which resulted in a $\dot{\varepsilon}$ of $5.3 \times 10^{-8}$ s$^{-1}$. In contrast, at a rather low homologous temperature, 0.4 $T_m$ or 275° C. for example, a $\dot{\varepsilon}$ of $10^{-1}$ s$^{-1}$ was reported for an applied stress of 0.12% of the shear modulus or 57 MPa with an average grain size of 25 nm in pure NC-Cu. As compared to pure NC-Cu, NC-Cu-10 at. % Ta at 1.5 to 2 times higher temperature and an order of magnitude higher stress has 6-8 orders of magnitude lower E. Indeed, such a response is reminiscent and more comparable to that of the creep performance achieved by advanced single-crystal Ni-based superalloys ($\dot{\varepsilon}$ of ~$10^{-8}$ s$^{-1}$).

In general, creep in NC-materials has been reported to follow the Coble creep mechanism, i.e., creep occurs through the transport of vacancies along GBs with a low stress exponent (in the order of 1 to 3). On the other hand, the NC-Cu-10 at. % Ta alloy exhibits stress exponents significantly higher than those associated with the diffusional creep and GB related mechanisms. Thus, creep resistance achieved with this NC-Cu-10 at. % Ta alloy outperforms almost all NC-materials. To comprehend this further, a compilation of experimental and theoretical $\dot{\varepsilon}$ data for various NC-materials is presented on an Ashby-type deformation mechanism map, which was derived based on creep constants for NC-Cu with 50 nm mean grain size. Experimental creep rate data from NC-metals such as Cu (25 nm grain size) and Ni (40 nm grain size) along with the theoretical constant Coble creep rate lines (circles) for Cu with average grain size of 50 nm are also presented. The reported experimental creep rate data in FIGS. 6 and 11 came from Mohamed, F. A. & Li, Y., "Creep and superplasticity in nanocrystalline materials: current understanding and future prospects," *Mater. Sci. Eng. A* 298, 1-15 (2001). As demonstrated, the reported creep properties of NC-Cu and NC-Ni fall within the Coble region. This is mainly owing to the GB diffusional processes, i.e., the vacancy/self-diffusion in Cu and Ni both through the GBs and lattice are faster at elevated temperatures, and hence, the diffusional creep controls the creep behavior. Thus, in these conventional NC-Cu and NC-Ni metals, the grain coarsening creates powerful kinetics that constantly evolves the microstructure. In contrast, creep rates for our NC-Cu-10 at. % Ta processed material show a drastic departure from the conventional thinking, i.e., Cu—Ta breaks the traditional paradigm with measured $\dot{\varepsilon}$ primarily in the dislocation-climb region (as shown with triangle points in plot (b)). In other words, the diffusional creep processes have been suppressed (or were even absent) in the this NC-Cu-10 at. % Ta alloy.

In general, these remarkable creep results can be extrapolated for various novel materials as: The creep rate preferably being less than $10^{-6}$ s$^{-1}$ at greater than 35% of the melting point of the material. More particularly, the creep rate can be less than $10^{-6}$ s$^{-1}$ at greater than 20% of their respective yield point values at temperatures greater than 35% of the melting point of the material. Additionally, the material typically has a yield strength in the range of 400 to 2000 MPa and has a room temperature compressive ductility greater than 3% or a tensile ductility of at least 0.5%.

The ability to disperse and retain, understand the underlying mechanisms, and further control using elevated temperature annealing places this class of materials above and beyond the reach of conventional nano-crystalline materials. Obviously, it is the existence of these heterogeneous Ta particles that causes the observed high creep resistance. In simplified terms, the uniformly dispersed Ta solute species throughout the Cu solvent matrix creates multi-length-scale obstacles, ranging in size from small to large particles. Thus, despite the disordered nature of the grain boundary regions created by the mechanical alloying process that could otherwise accommodate the movement of vacancies and atoms, the presence of these obstacles not only prevents their formation, but also blocks their movement within the grain and grain boundary region. Instead, it leaves only larger-scale crystallographic defect-based mediated processes, e.g., dislocation glide and climb.

Figure 7:
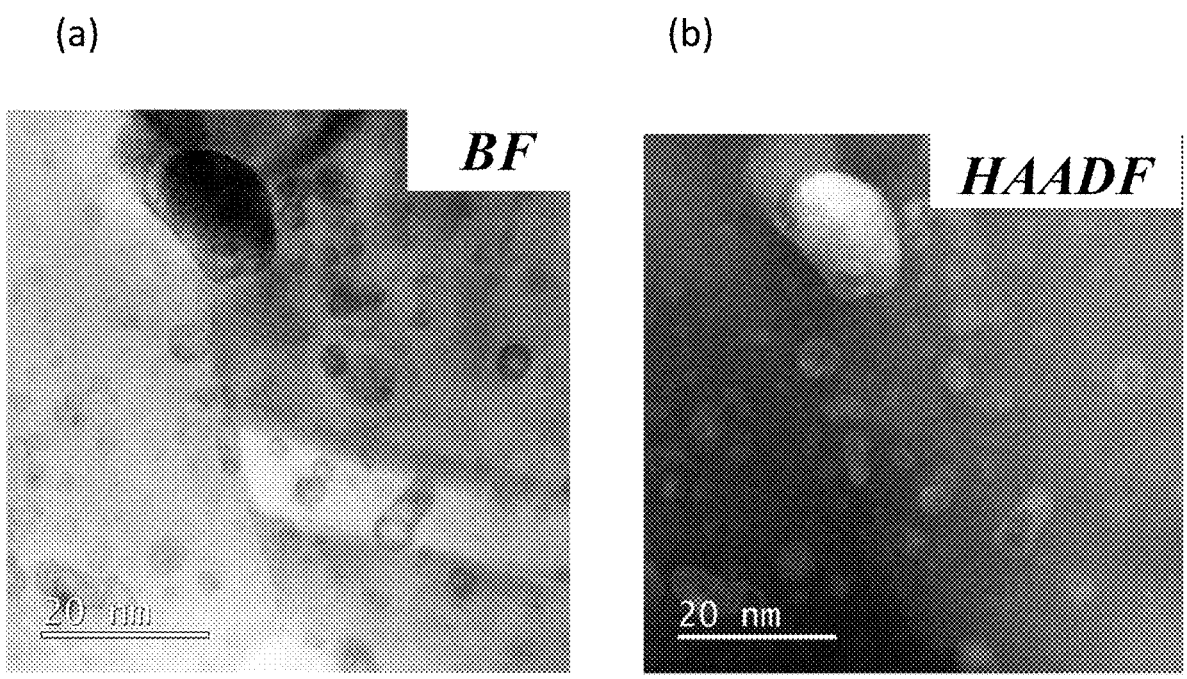
FIG. 7 includes high magnification transmission electron micrographs (TEM) of the exemplary Cu-10Ta (at. %) alloy with a high resolution bright field image (a); and, a corresponding high-angle annular dark field image (b).

To understand the creep property enhancement observed in our processed NC-Cu-10 at. % Ta, we turn our attention to the large number (density of $6.5 \times 10^{23}/m^3$) of coherent/semi-coherent (1-4 nm diameters) particles. FIG. 7 displays high magnification transmission electron micrographs of the exemplary Cu-10Ta (at %) alloy with a high resolution bright field image (a); and, a corresponding high-angle annular dark field image (b). In image (a), the HRTEM characterizations of post deformed creep samples (at 600° C. and 50% of yield stress) demonstrate the stability of nanoparticles, crucial for the resultant enhanced properties. The nanoparticles can be seen in the figure. Note, the coarsening rate of the nano-particles during creep at elevated temperatures is negligible. This is attributed to the coherency of the dispersions with the matrix. Further, due to highly stabilized nano-particles, the motion of a dislocation can be captured as the grain boundary bows during deformation, and the grain boundary interacts with numerous nano-particles. This is clearly identifiable in the high resolution bright field-scanning transmission electron microscope (BF-STEM) image of a post-creep sample in image (b). This observation means that particles located at grain boundaries are likely to increase the barrier strength for both grain boundary sliding and rotation; both are crucial and have been reported as creep mechanisms in conventional nano-crystalline metals. It can further be seen that the nano-particles pin the grain boundaries, i.e., Zener pinning, thereby, preventing significant grain coarsening.

In fact, in the case of our processed NC-Cu-10 at. % Ta alloy described here, quasi-static and dynamic strengths of greater than 1.2 GPa were also measured; these are greater than a factor of 2 higher than that predicted by Hall-Petch hardening for NC-Cu and presented with an apparent linear temperature dependence of flow stress. Similarly, core-shell type nano-particles have recently been reported in ODS ferritic alloys and Mo-alloys, where they are responsible for the excellent strength and ductility in these alloys.

Atomistic simulations were performed using a molecular dynamic code LAMMPS along with an embedded atom potential. Thus, highly stabilized nano-particles with strong structural affinity within the matrix and along the GB are the governing mechanisms for the unusual combinations of materials properties, i.e., high strength, extreme thermal stability, and creep resistance. This signals a beginning for innovative fundamental and applied science in designing NC-alloys with a multitude of simultaneously enhanced high temperature properties, i.e., the creep resistance of single crystals but with the additional benefit of much higher strength. For example, we show that a steady-state creep rate less than $10's^{-1}$ is attained even at 0.64 $T_m$ under a high applied stress, 1.2% of the shear modulus. The creep rates in NC-Cu-10 at. % Ta reported here are 6-8 orders of magnitude lower than almost all reported NC-metals. The divergent creep behavior reported here will likely alter the theoretical understanding and expectations of how NC-metals deform at high temperatures and in the future, will result in unique and significant applications and capabilities that have yet to be realized.

IV. Manufacturing Processing and Methodologies

Figure 8:
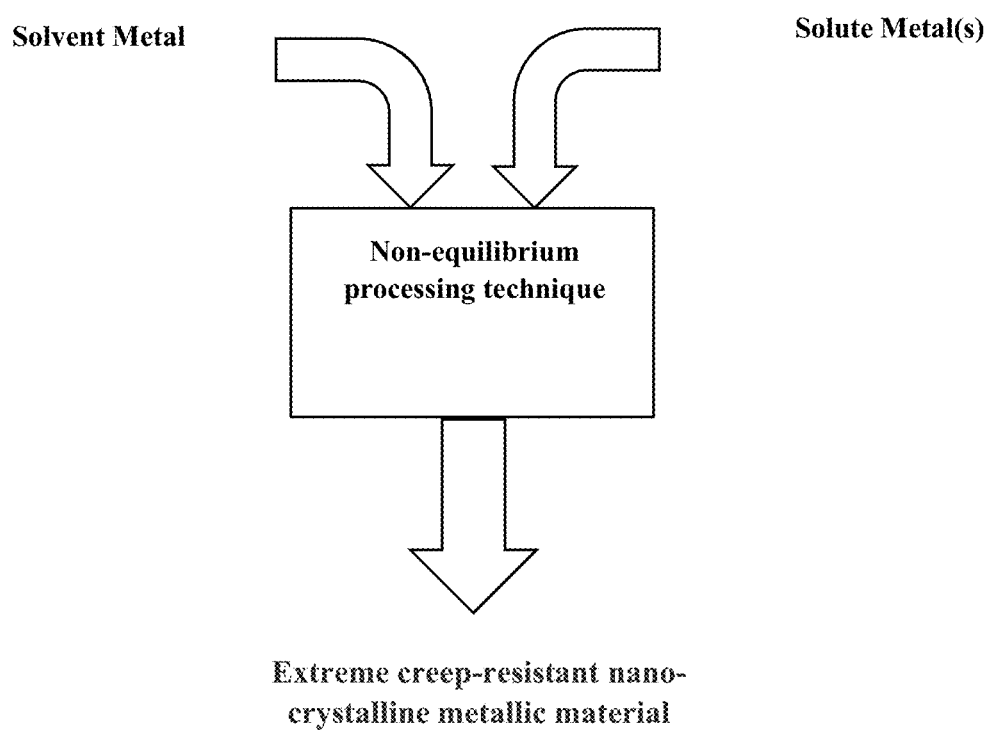
FIG. 8 is a schematic depicting a process for forming an extreme creep-resistant nano-crystalline metallic material according to embodiments of the present invention.

FIG. 8 is a schematic depicting a general process for forming extreme creep-resistant nano-crystalline metallic materials according to embodiments of the present invention. The solvent metal and one or more solute metals are brought together, and via a non-equilibrium processing technique, produce the extreme creep-resistant nano-crystalline metallic material. The non-equilibrium processing technique may be, but is not limited to, milling/machining (including ball milling), melt spinning, spray atomization, inert gas condensation, solution precipitation, physical vapor deposition, and electrodeposition. While all these techniques use powered metal precursors, the latter two may be better for coatings. Melt spinning forms thin ribbons of material.

Particulate (powdered) materials offer greater versatility when considering up-scaling to production and manufacturing levels. In part, this is because powder metallurgy is already a long-term, well established, and existing practice being used to produce many commercially available products through sintering and forging of metallic particles into fully dense objects.

Within milling there are two categories, high energy and low energy. High-energy milling is a term of art, which denotes powdered milling processes that facilitate alloying on an atomic level. U.S. Pat. Nos. 9,333,558 and 9,822,430 disclose some exemplary material systems and fabrication methodologies which, in accordance with embodiments of this invention, may be extended and/or adapted for providing nanostructures with extreme creep resistance. Those patents are herein incorporated by reference in their entireties and primarily described high-energy milling. As such, they utilize significantly higher impact energies than other powdered milling processes, such as planetary milling or attritor milling, wherein, due to the physical design of the apparatus, the energy imparted to the powder is less. Examples of high-energy milling includes high energy ball milling apparatuses such as the SPEX Industries, Edison, N.J. series of mills and Zoz GmbH, Germany, series of mills. Relatively lower energy types include the Pulverisette planetary ball mills from Fritsch GmbH, Idar-Oberstein, Germany; the PM series of planetary ball mills from Retsch GmbH, Dusseldorf, Germany; or the attritor type mills from Union Process, Akron, Ohio. For a more detailed comparison of milling devices, see, e.g., Table 1-2 on page 3 of H. Zoz, H. Ren, R. Reichardt, H. U. Benz, "Mechanical Alloying—Principle, Development & Current Activities (Part I-VII)," Thermec2000, International Conference on Processing & Manufacturing of Advanced Materials Dec. 4-8, 2000, Las Vegas, Nev., U.S.A., (available online at: http://gmbh.zoz.de/_AKTUELL/pdf_content/publications/v14.pdf), herein incorporated by reference in its entirety.

However, many of the lower energy mills (Planetary, Attritor and Drum) might be configured to produce materials as described herein. That is, the kinetic energy of the mills or the energy dosage, i.e., energy input into the starting metal powders can be increased by extending the milling time and or increasing the ball-to-powder ratio. Where the ball-to-powder ratio is defined by the mass of the milling ball bearings to that of the powder mass. In high energy milling processes the ball-to-powder ratio is between 1-10. However, in lower energy mills, the ball-to-powder ratio can be increased to values between 10-100. The same order of magnitude increase can be true of the milling time as well. Increasing both the ratio and the milling time can ultimately result in a lower energy mill being able to produce a similar powder product as in the high energy mills. It is noted, however, that due to inherent limitations on the devices themselves and their operation (such as the kinetic energy generated), not all low energy milling devices may be usable or otherwise practical for practicing embodiments of the invention.

Depending on the extent of milling operations, the range of intermixing varies from very large clusters (on the order of micro- to millimeters, containing a very large number atoms), to precipitates (nano- to micrometers, containing thousands of atoms), to particles (nanometers, containing tens of atoms), to single atoms. High energy may be imparted to the metallic system by applying high levels of kinetic or dynamic energy during the milling process where vials containing the precursor solvent and solute metals are shaken back and forth thousands of times a minute using impact milling media resulting in more than twice as many impacts a minute.

In general, mechanical milling/alloying produces nano-structured materials with grain sizes well below 100 nm by repeated mechanical attrition of coarser grained powdered materials. Precursor powders are loaded into a steel vial and hardened steel or ceramic balls are also added. The vial then is sealed and shaken for extended periods of time. For example, the vials may be shaken 1060 times a minute resulting in some 2120 impacts a minute. This high-energy ball milling results in an almost complete breakdown of the initial structure of the particles. The result particles can have average particle size or agglomerate size as low as 1-10 mm.

More specifically, on an atomic level, atoms can be forced into a metastable random solid solution or potentially occupy defect sites such as dislocations, triple junctions, and grain boundaries. This process is critical for setting up thermodynamic stabilization. The breakdown occurs due to the collisions of the particles with the walls of the vial and the balls. The energy deposited by the impact of the milling balls is sufficient to displace the atoms from their crystallographic positions. On a microscopic level, the particles fracture, aggregate, weld, and re-fracture causing the evolution of a heavily worked substructure in the milled powers. If more than one powder component is added into the vial, the components will be intimately mixed at an atomic level. As in mechanical alloying, this re-welding and re-fracturing continues until the elemental powders making up the initial charge are blended on the atomic level, such that either a solid solution and/or phase change results. The chemistry of the resulting alloy is comparable to the percentages of the initial elemental powders. With continued milling time, grain size reduction occurs, which eventually saturates at a minimum value that has been shown to scale inversely with melting temperature of the resultant compound. Of course, the process cycle can be interrupted to obtain intermediate grain size refinement of the powder blend and intermixing of its constituents.

The diameter, density, mass, number and/or ratio of the milling media may be altered to maintain the ball to powder mass (weight) ratio sufficiently high so as influence the rate of breakdown, physical microstructure, and morphology of the resultant powder produced. For instance, the ball-to-powder mass ratio may be 4:1, 10:1 or more.

To avoid cold welding and sticking to the vial and milling media, the milling process could be carried out using an additive, such as a surfactant. The additive or a surfactant may or may not be a liquid at room temperature.

The milling process may be performed at ambient or room temperature. Alternatively, the metallic powders can be continuously or semi-continuously cooled during the milling process. For instance, the milling process may be carried out using a liquid cryogen or low temperature fluid, such as liquid nitrogen. The formation of solid solutions between the constituents could be thought of as a competition between the external force of impinging balls creating finer and finer levels of intermixed alloy material via consolidation, shearing, and plastic deformation and competing processes such as diffusion-driven events such as phase separation. Thus, if mechanical milling could be performed at low enough temperatures, interdiffusion events, which are thermally activated, could all together be suppressed. As such, the likelihood of producing a solid solution is greatly enhanced. Given that the effect of the competing process is nullified, the result will be not only a much greater refinement of the grain size but also a much larger increase in the concentration of the solute in the solvent, i.e., though, non-equilibrium, the solubility limit will be higher.

In some embodiments, the elemental components are brought to a sufficiently high temperature as to create a solid solution which is then quenched rapidly to produce a supersaturated solid solution of the individual constituents. For instance, the material could be manufactured in powder form by spray atomization techniques where in the elemental components are brought to a sufficiently high temperature as to create a solid solution. Additionally, the elemental components might be brought to a sufficiently high temperature as to create a solid solution which is then quenched rapidly to produce a supersaturated solid solution of the individual constituents.

Exemplary Powder Processing and Consolidation Via Equal Channel Angular Extrusion (ECAE).

For the preparation of nanocrystalline (NC) Cu-10 at. % Ta powder, the powder was generated through high-energy cryogenic mechanical alloying. The desired composition was obtained by loading elemental Cu and Ta powders (~325 mesh and 99.9% purity) into a hardened steel vial along with the milling media (440C stainless steel balls) inside a glove box with an Ar atmosphere (oxygen and $H_2O$ are <1 ppm). The vials were loaded with 10 g of the Cu—Ta powder as well as the appropriate amount of media to ensure a ball-to-powder ratio of 5-to-1 by weight. A SPEX 8000 M shaker mill was utilized to perform the milling at cryogenic temperature (verified to be ~−196° C.) for 4 hrs (14.4 ks) using liquid nitrogen. To ensure the vial remained at cryogenic temperature, a thick polymer sleeve was retrofitted to fit around the vial in the SPEX mill with an inlet and outlet vent to flow the liquid nitrogen. Before starting the milling process, the vial was placed in the polymer sleeve with the liquid nitrogen flowing for approximately 20 min (1.2 ks) to ensure the vial approached −196° C. Once the milling was completed, the vials were placed back into the glove box, opened, and stored. This milling procedure was performed until 100 grams of NC-Cu-10 at. % Ta powders were generated. The resulting powder after cryogenic mechanical milling was an unagglomerated mass of powder with particulates ranging in size from ~20-100 μm.

For consolidating the NC-Cu-10 at. % Ta powder to bulk, equal channel angular extrusion (ECAE) was used as the consolidation process. Billets of Ni 201 with dimensions of 25.4 mm×25.4 mm×90 mm had cylindrical chambers with a diameter of 10 mm and 50 mm long made within them for housing the powder. The powder was loaded into the chamber followed by press-fitting a Ni 201 plug into the open end to seal the chamber. Both of these steps were performed within the glove box. Before starting the ECAE process, the die assembly used for processing the billets was preheated to 350° C. to minimize thermal loss during the ECAE processing. Additionally, the billets containing the powder were held at 700° C. in a box furnace purged with Ar for 40 min (2.4 ks) to ensure they reach the desired extrusion temperature. The heated billets were dropped into the ECAE tooling as quickly as possible from the furnace and extruded at an extrusion rate of 25.5 mm/s. This step was repeated 4 times following ECAE process route $B_c$ to prevent imparting a texture to the consolidated powder. By the extrusion channel having an angle of 90°, a total strain of 460% was imparted onto the powder-containing billet as a result of processing. The creep specimens were then machined from these billets, within the region containing the consolidated powder, via wire electric discharge machine. Finally, SEM imaging confirmed the creep specimens to be fully consolidated after the ECAE process with no porosity or as-milled particle boundaries being present. Note that the change in processing conditions or steps, such as ECAE process temperatures will result in different microstructural statistics such as grain size distributions. However, as previous work shows, the nanoparticle density mainly depends on the Ta concentrations which are the primary features resulting in an enhanced creep behavior. See Hornbuckle, B. C. et al., "Effect of Ta solute concentration on the microstructural evolution in immiscible Cu—Ta Alloys," *JOM* 67, 2802-2809 (2015), herein incorporated by reference.

Impurity Levels.

Impurities are a concern for all material processing techniques, and this holds true for mechanical alloying via ball milling. During ball milling, the powder can pick-up impurities by being exposed to the atmosphere and from the milling media itself. To minimize oxygen contamination, all powders were stored (before and after processing) as well as loaded into both vials and billets under an Ar atmosphere (O and $H_2O$<1 ppm) inside a glove box. Despite these steps, EDS analysis detected approximately 0.75 at. % O in the bulk of the alloy.

Three-dimensional (3D) atom probe tomography is becoming a pervasive characterization technique capable of analyzing a variety of nano-crystalline materials by providing equal sensitivity detection of all atoms with 3D reconstructions of their spatial locations nearing perfect lattice rectification, i.e., sub-nanometer spatial resolution (~0.1-0.3 nm resolution in depth, z-axis, and 0.3-0.5 nm laterally, x and y axis). Additionally, the mass resolution for current state-of-the-art atom probe systems at full width at half maximum (FWHM), full width at tenth maximum (FWTM), and full width at one percent maximum (FW1% M) are 1:1000, 1:475, and 1:275 respectively for a standard aluminum specimen. This provides unparalleled ability to determine chemical partitioning of species between phases and their effect on intrinsic properties, including mechanical strength which was not possible before. For the small particles residing in the matrix and along grain boundaries in the creep resistance metallic systems presented here, atom probe tomography has been used to provide highly accurate chemical analysis not possible through any other characterization techniques. It is expected that in the future such chemical analysis will be required as method to distinguish the key patentable features of such nanoscale particles and/or features in newly developed nanotechnology.

To verify the oxygen (O) level, atom probe tomography was performed on as-milled powder and as-milled powder that was annealed for 1 hr at 450° C. under a reducing atmosphere and NC-Cu-10 at. % Ta ECAE processed at 700° C. APT results found all conditions to contain less than 1.25 at. % O. Consequently, the O contamination in the alloy has been minimized by following the procedural steps highlighted earlier. Finally, iron (Fe) contamination from the milling media was also detected via EDS but could not be accurately measured; thus atom probe was utilized again. From the APT analysis, the Fe contamination was found to vary between atom probe tips; however, the highest Fe content found was 1 at. % with the lowest being 0.05 at. %. This range indicates the contamination from the Fe is also minimal.

Microstructural Characterization.

Figure 9:
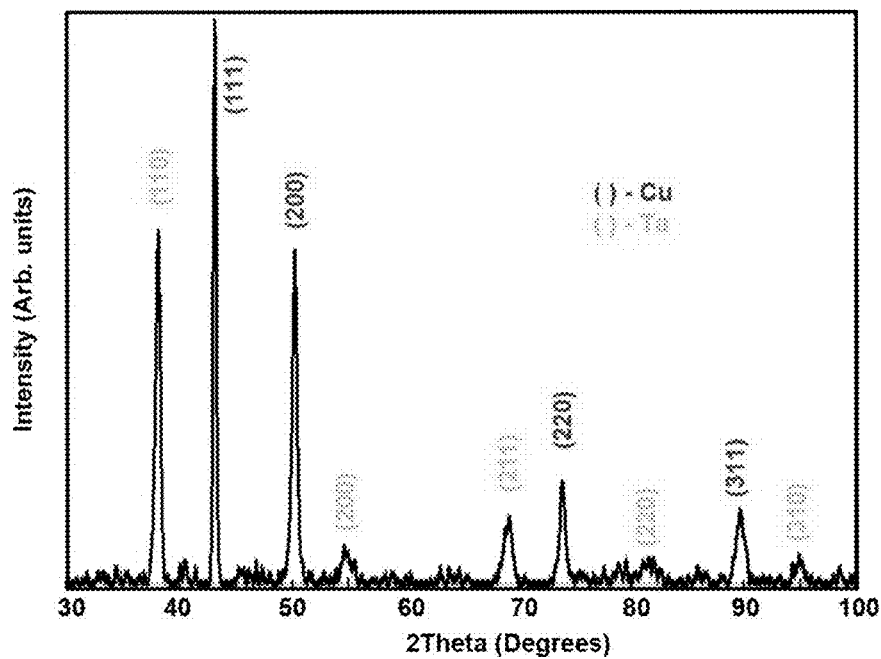
FIG. 9 is an X-ray diffraction plot showing Cu and Ta reflections from an exemplary NC-Cu-10 at. % Ta sample processed at 700° C.

X-ray diffraction were performed on samples using an X'Pert PRO PANalytial MPD X-ray diffractometer with a Cu Kα ($\lambda$=0.1542 nm) radiation source. Due to the resolution limit, the grain size estimations from Scherrer's equation for the Cu matrix and Ta phase were inaccurate. FIG. 9 indicates the X-ray reflections from Cu and Ta for the initial condition where a random texture can be identified. Therefore, to quantify the grain sizes and microstructure, Transmission Electron Microscopy (TEM) was employed. TEM characterizations were carried out in the initial and post-deformed conditions using aberration corrected ARM-200F and JEOL-2010F at 200 kV. Several images were captured in the bright field and the high resolution TEM as well as STEM mode to analyze the microstructure and quantify the statistics such as grain size distribution etc. The TEM samples were prepared through conventional thinning procedures where a 3 mm disk from the bulk specimen was thinned to about 70 μm following which they were dimpled to about 5 μm thickness. Ion milling was done under liquid nitrogen temperatures to obtain electron-transparent regions in the specimens. The samples were also plasma cleaned in argon (Ar) prior to TEM observations to minimize contamination.

The Microstructure.

The primary microstructural characterization of NC-Cu-10 at. % Ta ECAE processed at 700° C. revealed the presence of binary phases of Cu and Ta consistent with the XRD measurements. The TEM characterization along with a precession diffraction data is illustrated in FIG. 9 illustrating a high degree of randomness in the orientation relationship between the grains of NC-Cu matrix with an average equiaxed grain diameter of 50±17.5 nm. Orientation details were extracted from a region in the sample using the TOPSPIN software (resolution: 2 nm) on the TEM where a precession diffraction technique was employed. In this technique, the incident electron beam is tilted and processed along a conical surface, having a common axis with the TEM optical axis. Surprisingly, even though our processed NC-material was consolidated to bulk, through severe plastic deformation, at 700° C. with a total accumulated strain of 4.6 (i.e., 460%), the averaged grain size were still in a NC-regime. The tantalum particle size distribution has an average diameter of 32±7.5 nm. These smaller Ta based particles, diameters <32 nm, as well as the presence of nano-twins was found within the NC-Cu grains. We note that twinning is another important deformation mechanism in NC-Cu which can be suppressed by the presence of fine particles (i.e., nanoclusters). Further, the processing route produces a wide range of Ta particle sizes, ranging from atomic nanoclusters (average diameter of 3.18±0.86 nm) to much larger precipitates. The energy of the interface between the nanoclusters and the Cu matrix can be used to quantify the type of coherency and the cluster diameters over which the degree of coherency persists. Characterizing the coherency has indicated that this material has coherent, semi-coherent and incoherent nanoclusters (d<3.898 nm, 3.898-15.592 nm and >15.592 nm, respectively). The nanoclusters also have misfit lattice dislocations at the interface indicative of the misfit strain present which was identified through utilizing inverse fast Fourier transform analysis. On average, the misfit strain in the sample is about 5.8% but it can be as high as 11%.

Mechanical Characterization at Quasi-Static Conditions.

Quasi-static compression and tension tests of specimens over a temperature range from ambient up to 1000° C., were performed using an Instron load frame equipped with a 10 kN and 50 kN load cell respectively and an ATS clam-shell heating furnace capable of maximum temperature of 1500° C. The specimens for compression were cylinders 3 mm in diameter and length (aspect ratio 1.0) whereas for tension rectangular dogbones with length, width and thickness of 3 mm: 1 mm: 1 mm were used. Tests were conducted at 24, 200, 400, 600, 800, 900, and 1000° C. with a strain rate of $8 \times 10^{-4}$ s$^{-1}$ for compression and $1 \times 10^{-3}$ s$^{-1}$ for tension. The system was held at the testing temperature for 15 min prior to loading to provide uniform temperature within the specimen. The push rods of the load frame were constructed of precision-machined $ZrO_2$ rods to minimize heat losses. Boron nitride lubricated polished WC-disks were used as platens for compression testing. Specimens were loaded under displacement control with a across head displacement of 0.15 mm/min. The force-displacement data was compliance corrected for all tests.

Figure 10:
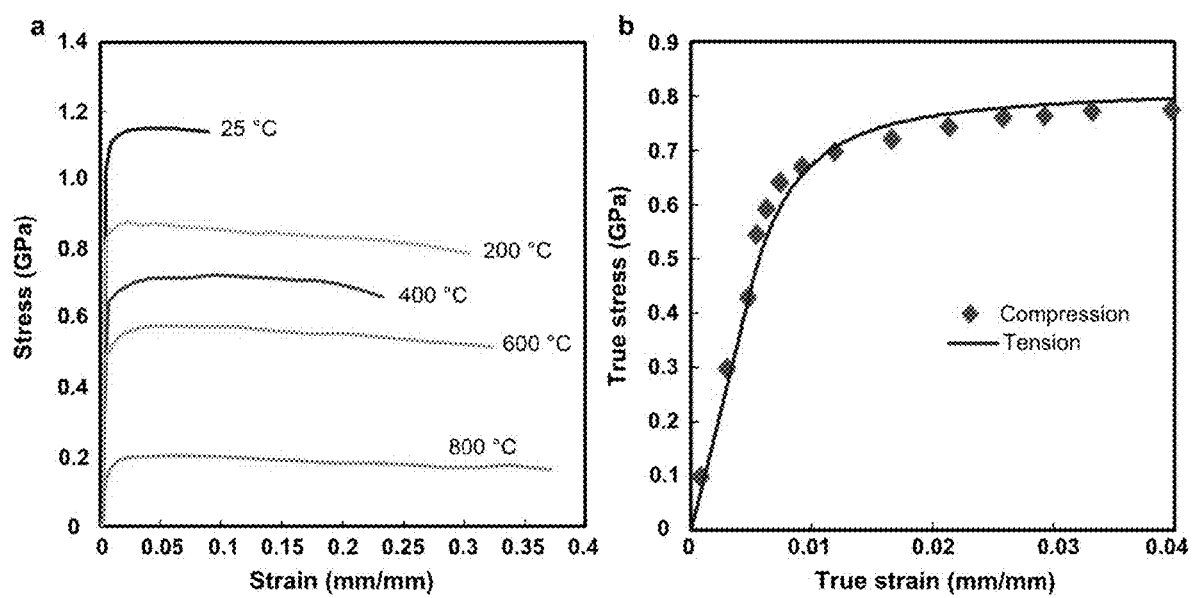
FIG. 10 shows the mechanical behavior of NC-Cu-10 at. % Ta at quasi-static strain rates. Stress-strain response of NC-Cu-10 at. % Ta samples are depicted including plot (a) of a compressive stress-strain curve tested at a strain rate of $8\times10^{-4}$/s at various temperatures, and plot (b) of a tension-compression curve for samples tested at a strain rate of $1\times10^{-3}$/s. The line and diamond marker correspond to the tensile and compressive data respectively. The curves exhibit elastic-nearly plastic behavior with no strain hardening and tension-compression asymmetry is absent.

FIG. 10 shows the stress-strain responses. The compressive curves in plot (a) exhibit an elastic—nearly perfectly plastic behavior over the entire temperature with no significant strain hardening. Furthermore, the flow stress presented with an apparent linear temperature dependence as compared to the expected sigmoidal manifestation expected for pure coarse grained Cu. Moreover, the Cu grain size after testing at 800° C. was estimated to be about 90 nm, indicating that the grain coarsening is very limited and the reduction in observed yield and flow stress is a result of increased thermal softening only. Thus, our processed NC-Cu-10 at. % Ta exhibits an extremely stable microstructure and unusual mechanical properties. In general, FCC materials such as Cu should not show any tension-compression asymmetry which is also evident from plot (b). The response in tension is also perfectly elastic-plastic in nature with negligible strain hardening identical to the compression tests. This response has implications on the tensile creep behavior where this material will be expected to behave in a similar way for tensile type creep tests as compression.

Mechanical Characterization at Creep Conditions.

Compressive cylindrical creep experiments were performed using 2320 series lever arm creep tester (Applied Test Systems, Butler, Pa., USA) with 5:1 lever arm ratio. Both diameter and height of the cylindrical creep specimens were approximately 3 mm. The specimens were kept at the center of a 3210 series split tube furnace to maintain constant temperature across the sample height. A heating rate of 200° C./h and a soak time of 0.5 h was utilized for the creep tests. For the best temperature measurement and control, a thermocouple was always wrapped around the creep specimens to maintain good contact. An ST 1278 incremental length gauge with ±1 μm accuracy was used to measure the conventional creep strain. The compression creep experiments were conducted in air at 873 K and 0.45, 0.50, 0.55, 0.60, and 0.65 of YS, 773 K and 0.70, 0.75, and 0.80 of YS, and 673 K and 0.70, 0.80, 0.90, and 1.00 of YS. The specimens were first coated with thin layer of boron-nitride for lubrication and then placed in-between the compression platens. Creep test temperatures were attained at a constant heating rate followed by soaking at the set temperature (0.5 h) to avoid the temperature fluctuation during the test. After the soaking stage, the loading begins automatically which is followed by the start of the creep test. These tests were typical constant force tests. All the creep data was recorded from the test start to finish. Further, specimens did not reach failure as tests were stopped before the strain rate exponentially increases with stress, i.e., tertiary creep domain and our primary objective was to characterize the secondary creep rates. Also, note that for most of the creep tests, the total strain values did not exceed more than about 6%. All the crept samples were quenched in water immediately after unloading to preserve the crept microstructure. The physical dimensions of the crept samples were measured after the test and compared with the extensometer measurements. The minimum creep rate was calculated from the slope of the conventional creep strain vs. time curve.

Theoretical Deformation Map.

Theoretical deformation maps identify the deformation modes by which a polycrystalline material can deform. In the case of creep deformation maps, the dominant mechanism is defined by considering the stress and temperature values for a particular steady state creep rate value. The upper bound, i.e., the theoretical shear strength, depicts the limit beyond which flow is possible even in defect free crystals. This value of stress is on the order of shear modulus and is independent of temperature. In the case of materials with defects, the motion of dislocations contributes towards plastic deformation, i.e., the dislocation mechanisms are glide, climb and temperature dependent dislocation creep. In the case of glide, impurities, solutes, precipitates and etc. that are present in the material provide obstacles to plastic flow. At high temperatures, the dislocation creep mechanism is predominant where the deformation is diffusion controlled and the strain rate is a non-linear function of stress. Further, the motion of point defects also leads to plastic deformation either through the grains (Nabarro-Herring) or grain boundaries (Coble). These diffusional processes are independent of each other and depend only on the temperature. The mechanisms which relate the steady state creep rate ($\dot{\varepsilon}$) to the applied stress can be characterized by using the following equation:

$$\dot{\varepsilon} = AD_0 \exp\left(-\frac{Q}{RT}\right)\left(\frac{Gb}{kT}\right)\left(\frac{b}{d}\right)^p \left(\frac{\sigma}{G}\right)^n$$

where A is a dimensionless constant, $D_0$ is a frequency factor, Q is the activation energy, R is the gas constant, T is the temperature, G is the shear modulus at the particular temperature, b is the burgers vector, k is the Boltzmann's constant, d is the grain size, p is the grain size exponent, n is the stress exponent and σ is the applied stress. The value of the constant A and exponents depends on the mechanism considered. The values for the constants can be found in Ashby, M. F., "A first report on deformation-mechanism maps," *Acta Metall.* 20, 887-897 (1972). After incorporating the threshold stress, the rate controlling creep deformation mechanism in the high stress—high temperature regime was identified as dislocation climb from the deformation map, where the apparent stress exponents of 10-18 were reduced to 4-8 (true stress exponents).

Creep Rate Data as a Function of Applied Load with and without Threshold Correction.

Figure 11:
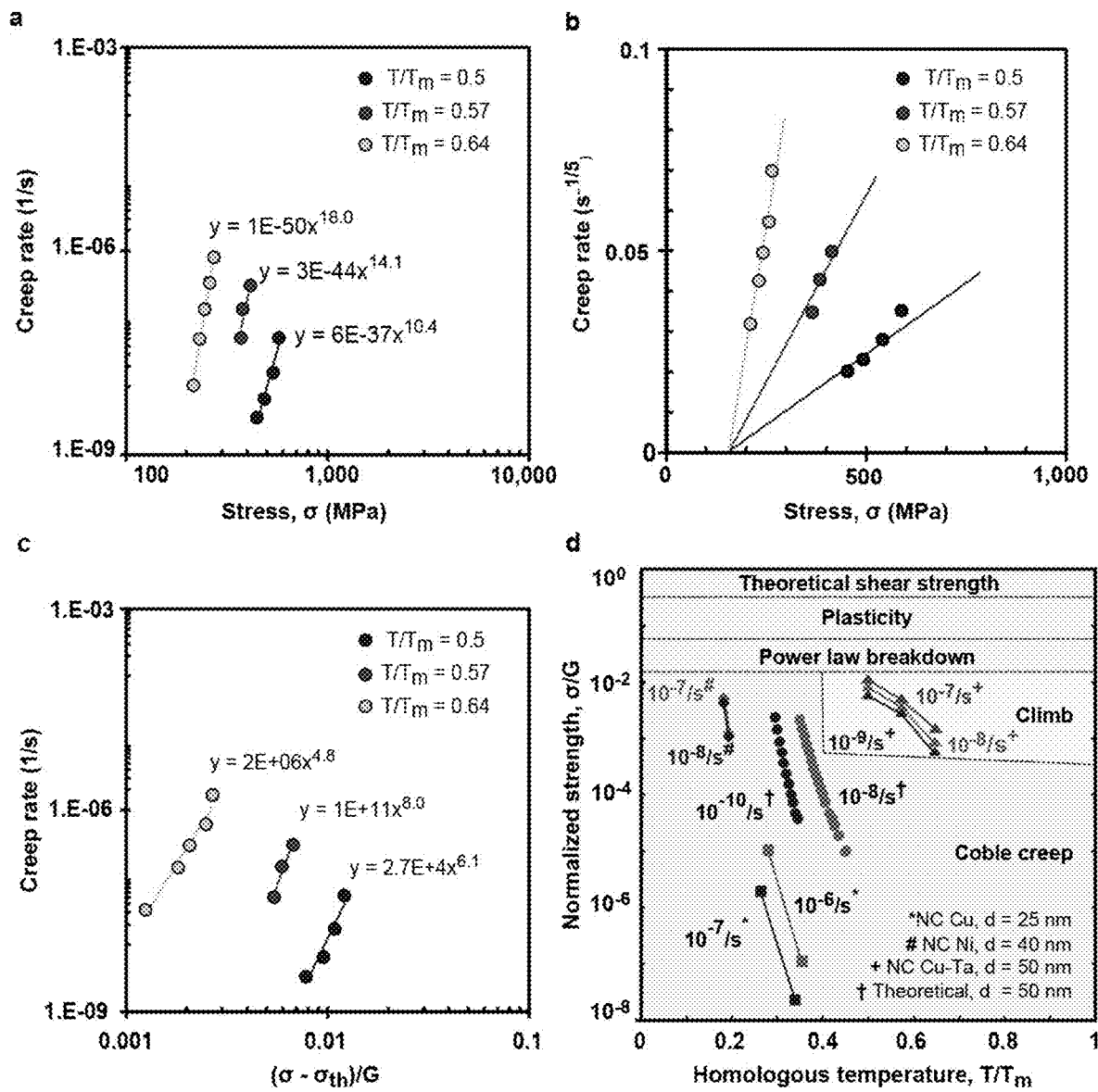
FIG. 11 depicts various creep responses of NC-Cu-10 at. % Ta with and without threshold correction, where plot (a) shows the creep rate versus applied stress without threshold correction for various temperatures, plot (b) shows the creep rate versus applied stress with stress exponent=5 for various temperatures to extract the threshold stress, plot (c) shows the creep rate versus normalized stress which was obtained by subtracting the threshold stress from the applied stress for various temperatures, and plot (d) is a theoretical deformation map with threshold corrected data (n=5) of NC-Cu-10 at. % Ta alloy with previously reported experimental creep rates of NC-Cu and NC-Ni.

The NC-Cu-10 at. % Ta processed at 700° C. subjected to creep, exhibits a high stress exponent (n) as evident from the plots in FIG. 11. Plot (a) shows the creep rate versus applied stress without threshold correction for various temperatures. In order to rationalize the high n values, appropriate threshold stress values were determined by a standard linear extrapolation method where creep rate curves were plotted as a function of applied instantaneous stress at various temperatures (i.e., $\dot{\varepsilon}^{1/n}$ vs. σ (Plot (b)). The data points fit in a straight line which on extrapolation to zero strain rates will yield a threshold value. The inadequacy with this method is that multiple straight lines exist for different n values provided the experimental data covers a range of strain rates. The stress exponent value of 5 for threshold correction was deemed appropriate for this study, which corresponds to dislocation climb based deformation mechanism as the threshold stress arises due to the influence of dislocations in the creep process. Using the approximation, a threshold stress of 165 MPa was deduced and subtracted from the applied stress to illustrate the relation between normalized stress and creep rate (Plot (c)). The stress exponent values were computed to be between 4 and 8 at various temperatures after threshold correction indicating the absence of diffusional creep processes during creep. The data obtained through threshold correction for NC-Cu-10 at. % Ta along with the literature data of NC-Cu and NC-Ni are show in plot(d). It is evident that NC-Cu-10 at. % Ta exhibits extreme creep resistance where the NC-Cu-10 at. % Ta alloy shows an order of magnitude high stress results in 6-8 times of lower $\dot{\varepsilon}$.

Atomistic Modeling.

The qualitative atomistic simulations were performed using a large-scale atomic/molecular massively parallel simulator (LAMMPS) along with a semi-empirical embedded atom potential (EAM). This EAM potential was parameterized using an extensive database of energies and configurations from density functional theory (DFT) calculations of energy differences between various crystal structures of pure Cu and pure Ta, the formation energies of coherent Cu—Ta interfaces, and the binding energy of several ordered compounds, such as $L1_2$-$Cu_3Ta$, $L1_0$-CuTa, $L1_1$-CuTa, $B_2$—CuTa, and $L1_2$-$Ta_3Cu$. The Voronoi tessellation method was used to construct 3D NC-Cu with average grain size of 8 nm. Further, in the same NC-Cu sample, spherical tantalum particle with random distribution and size were doped with average sphere radius of 0.7 nm to obtain the 10% Ta concentrations. The total number of atoms in a simulation cell was 1.4 million atoms (with approximate box sizes in the range of 35 nm×38 nm×15 nm). The samples were first relaxed at the desired temperature using an NVT (conserving the number of atoms, volume, and temperature) ensemble for 5 ns, followed by an independent relaxation in three directions using an NPT (conserving the number of atoms, pressure, and temperature to mimic bulk behavior) ensemble for another 5 ns with zero pressure in all the directions. These relaxations were performed to uniformly distribute the excess free energy through the whole system. Atomistic simulations were carried out using an MD time step of 1 fs. A periodic boundary condition was adopted in all directions. Then, the samples were loaded under tension along the y-axis with a strain rate of $10^8$/s and at 600° C. while maintaining a periodic and pressure-free boundary conditions along the x- and z-directions, respectively. The tensile simulations (up to 3% strain) were performed to increase the defect (dislocation twin, stacking fault) densities before the creep simulation to mimic the experimental sample microstructure.

Finally, the NC and NC-Cu-10 at. % Ta simulation models were crept at 600° C. and 295 MPa applied stress along the y-direction, whereas deformation in the other two directions was carried out by maintaining a zero pressure. The desired stresses were applied in the incremental form (a 5 MPa step) until 295 MPa, and then simulations were run at a constant applied stress for 5 ns or until failure. To overcome the relatively short time interval of MD simulation, we performed simulations at elevated temperatures, where the distinct effects of GB diffusion (liquid-like fast GB diffusion), if present, were then clearly identifiable, i.e., grain growth and microstructural instability. Minimum topological changes with addition of Ta, i.e., grain growth are typically observed in NC-materials due to both the stress-induced grain-boundary diffusive fluxes and grain-boundary sliding are hinder in Cu—Ta alloys. (Note: a video of the creep simulation of NC-Cu and NC-Cu-10 at. % Ta is posted as Extended Data Video 1 available online at https://www-.nature.com/articles/nature19313).

Microstructural Stability and Creep Mechanisms.

Reports of room temperature grain growth, a common feature unique to highly pure NC-metals, has been reported numerous times and is in stark contrast to the growth which takes place at much higher temperatures in coarse grain metals (e.g., experimental work of Chokshi on NC-Cu). Considerable research has been performed to address this specific limitation culminating in two main methods, one based on thermodynamics and the other kinetics. The thermodynamic approach deals with reducing the excess free energy of the grain boundaries through solute segregation while the kinetic approach deals with reducing grain boundary mobility. The thermodynamic approach has been viewed more promising as it attenuates the driving force for grain growth while kinetic approaches based on solute drag chemical ordering, and Zener pinning, continually fight against the system reaching equilibrium with an Arrhenius temperature dependence.

In light of these two competing mechanisms, there has been much discussion on which method may provide a more successful path in bringing about the realization of commercially available bulk NC-metals. In many cases, such debate has been fostered by the fact that it is not always possible to fully separate or delineate the contributions of these two competing stabilization mechanisms, in preventing grain growth in NC-metals. For instance, thermodynamic stabilization of NC-grain size (GS) involves examining the energetic penalty associated with the high volume fraction of the GBs, and the possibility of solute segregation driving this associated excess free energy to zero. However, intertwined in this scenario are the kinetic aspects of solute drag, and its role in reducing grain growth in this thermodynamic stabilization construct, which has been an area of active research. Additionally, the precipitation of secondary, solute-rich phases have been experimentally observed to disrupt the stabilization set in place by the thermodynamic mechanism. However, recent research has shown that just because phase separation or precipitation occurs does not necessarily mean that a stabilized NC-system does not exist. That is, recent theoretical work has predicted the existence of stable duplex systems, wherein both GB segregation and phase separation occurs, resulting in both a stable NC-GS (i.e., GB energy of zero) and the precipitate structure coexisting with one another. These types of microstructures are currently under investigation. In reference to these particular immiscible NC-Cu-10 at. % Ta alloys the nature of their thermal decomposition and formation of an extremely high density of particles, occurring primarily along grain boundaries, gives rise to an unusually stable microstructure. Additionally, we have reason to believe the exact mechanisms of Zener pinning in this system may be more complicated than conventional theory. Nevertheless, NC-Cu-10 at. % Ta alloys primarily stabilized kinetically by small scale coherent particles provides a design route to development of advanced structural materials for variety of applications including the high-strength high temperature applications. Further, it is a new beginning for innovative fundamental and applied science in NC-metals. Many of the processing and consolidation challenges that have haunted NC-metals are now more fully understood opening the door for bulk NC-metals and parts to be produced. Recently this has been made possible by the advancement of thermodynamic, kinetic and thermo-kinetic methods of stabilizing their microstructures. The Cu—Ta family of alloys are currently one of the very few systems which has been shown to retain NC-grain sizes in a fully dense part allowing the study of these microstructures under such extreme environments.

Conventional problems associated with high temperature creep deformaton that usually result in part failure can be eleviated by using the novel metallic systems. Indeed, these materials are suited for applications which require high temperature performance for extended periods of time, such as, for example: turbine blades, moving parts, or structural components in load bearing applications.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

We claim:

1. An extreme creep-resistant nano-crystalline metallic material comprising:
 a matrix formed of a solvent metal comprising crystalline grains having diameters of no more than about 500 nm; and
 a plurality of dispersed metallic particles formed on the basis of a solute metal in the solvent metal matrix and having diameters of no more than about 200 nm,
 wherein the particle density along the grain boundary of the matrix is as high as about 2 $nm^2$ of grain boundary area per particle so as to substantially block grain boundary motion and rotation and limit creep at temperatures above 35% of the melting point of the material.

2. The material of claim 1, wherein the solvent metal comprises 50 to 99.9 atomic percent (at. %) of the material, and the dispersed metallic solute metal comprise 0.1 to 50 atomic percent (at. %) of the material.

3. The material of claim 2, wherein the solvent metal comprises copper (Cu) or a copper alloy, and the solute metal comprises one or more metals selected from the group consisting of: chromium (Cr), vanadium (V), niobium (Nb), tantalum (Ta), iron (Fe), cobalt (Co), molybdenum (Mo), tungsten (W), osmium (Os) antimony (Sb), cadmium (Cd), manganese (Mn), titanium (Ti), zirconium (Zr), hafnium (Hf), scandium (Sc), yttrium (Y), and strontium (Sr).

4. The material of claim 1, wherein the particles number densities within the volume of material is in the range of $10^{15}$ to $10^{30}$ per cubic meter.

5. The material of claim 1, wherein the creep rate is less than $10^{-6}$ $s^{-1}$ at greater than 35% of the melting point of the material.

6. The material of claim 1, wherein the creep rate is less than $10^{-6}$ $s^{-1}$ at greater than 20% of their respective yield point values at temperatures greater than 35% of the melting point of the material.

7. The material of claim 1, wherein at least some of the particles further comprise additional elements.

8. The material of claim 1, wherein at least some of the particles comprise coherent particles having diameters less than about 5 nm.

9. The material of claim 1, wherein at least some of the particles comprise semi-coherent particles having diameters between about 5 nm and about 20 nm.

10. The material of claim 1, wherein at least some of the particles comprise incoherent particles having diameters in excess of about 20 nm but no more than about 200 nm.

11. The material of claim 1, wherein the solute metal is at least 0.1 atomic percent of the material so as to limit rotation of grains to no more than about 30 degrees.

12. The material of claim 1, wherein the material has a room temperature yield strength in the range of 300 to 2000 MPa.

13. The material of claim 1, wherein the material has a room temperature compressive ductility greater than about 3% or a tensile ductility of at least about 0.5%.

14. A process for forming an extreme creep-resistant nano-crystalline metallic material comprised of a solvent metal comprising 50 to 99.9 atomic percent (at. %) of the material, and at least one solute metal dispersed in the solvent metal, comprising 0.1 to 50 at. % of the metallic material, the process comprising:
    subjecting metals of the solvent metal and the at least one solute metal to a non-equilibrium processing technique so as to produce:
        a matrix formed of a solvent metal or alloy and comprising crystalline grains having diameters of no more than about 500 nm; and
        a plurality of dispersed metallic particles formed from a basis of the solute metal in the solvent metal matrix and having diameters of no more than about 200 nm,
        wherein the particle density along the grain boundary of the matrix is as high as about 2 $nm^2$ of grain boundary area per particle so as to substantially block grain boundary motion and rotation and limit creep at temperatures above 35% of the melting point of the material.

15. The process of claim 14, wherein the non-equilibrium processing technique comprises: milling, melt spinning, spray atomization, inert gas condensation, solution precipitation, physical vapor deposition, and electrodeposition.

16. The process of claim 15, wherein the milling is high energy milling or low energy milling.

17. The process of claim 14, further comprising: performing a bulk consolidation process on the material.

\* \* \* \* \*